United States Patent
Miyake et al.

(10) Patent No.: US 9,449,574 B2
(45) Date of Patent: Sep. 20, 2016

(54) LCD OVERDRIVING USING DIFFERENCE BETWEEN AVERAGE VALUES OF GROUPS OF PIXELS BETWEEN TWO FRAMES

(71) Applicant: SEMICONDUCTOR ENERGY LABORATORY CO., LTD., Atsugi-shi, Kanagawa-ken (JP)

(72) Inventors: Hiroyuki Miyake, Kanagawa (JP); Hideaki Shishido, Kanagawa (JP); Seiko Inoue, Kanagawa (JP)

(73) Assignee: Semiconductor Energy Laboratory Co., LTD., Kanagawa-ken (JP)

( * ) Notice: Subject to any disclaimer, the term of this patent is extended or adjusted under 35 U.S.C. 154(b) by 179 days.

(21) Appl. No.: 14/049,300

(22) Filed: Oct. 9, 2013

(65) Prior Publication Data
US 2014/0104262 A1 Apr. 17, 2014

(30) Foreign Application Priority Data

Oct. 12, 2012 (JP) ................................ 2012-226747

(51) Int. Cl.
*G09G 3/36* (2006.01)
*G02F 1/1368* (2006.01)

(52) U.S. Cl.
CPC .......... *G09G 3/3696* (2013.01); *G09G 3/3614* (2013.01); *G09G 3/3688* (2013.01); *G02F 1/1368* (2013.01); *G09G 3/3648* (2013.01); *G09G 2320/0219* (2013.01)

(58) Field of Classification Search
CPC combination set(s) only.
See application file for complete search history.

(56) References Cited

U.S. PATENT DOCUMENTS 5,563,727 A * 10/1996 Larson et al. ................ 349/143
5,731,856 A   3/1998 Kim et al.
5,744,864 A   4/1998 Cillessen et al.
(Continued)

FOREIGN PATENT DOCUMENTS

EP   1737044 A   12/2006
EP   2226847 A   9/2010
(Continued)

OTHER PUBLICATIONS

Fortunato.E et al., "Wide-Bandgap High-Mobility ZnO Thin-Film Transistors Produced at Room Temperature,", Appl. Phys. Lett. (Applied Physics Letters) , Sep. 27, 2004, vol. 85, No. 13, pp. 2541-2543.
(Continued)

*Primary Examiner* — Quan-Zhen Wang
*Assistant Examiner* — Chad Dicke
(74) *Attorney, Agent, or Firm* — Nixon Peabody LLP; Jeffrey L. Costellia

(57) ABSTRACT

In a video voltage comparator circuit, an average of first video voltages applied to pixel electrodes of pixels in the second-half rows in a k-th frame period (k is a natural number) is compared with an average of second video voltages applied to pixel electrodes of pixels in the first-half rows in a (k+1)th frame period for each row. In an overdrive voltage switching circuit, when a difference obtained from the comparison in the video voltage comparator circuit is greater than or equal to a threshold value, the overdrive voltage in the (k+1)th frame period is switched to a first overdrive voltage, and when the difference obtained from the comparison in the video voltage comparator circuit is less than the threshold value, the overdrive voltage in the (k+1)th frame period is switched to a second overdrive voltage lower than the first overdrive voltage.

19 Claims, 12 Drawing Sheets

(56) References Cited

U.S. PATENT DOCUMENTS

| | | | |
|---|---|---|---|
| 6,100,947 A * | 8/2000 | Katayama | 349/38 |
| 6,294,274 B1 | 9/2001 | Kawazoe et al. | |
| 6,563,174 B2 | 5/2003 | Kawasaki et al. | |
| 6,727,522 B1 | 4/2004 | Kawasaki et al. | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,211,825 B2 | 5/2007 | Shih et al | |
| 7,282,782 B2 | 10/2007 | Hoffman et al. | |
| 7,297,977 B2 | 11/2007 | Hoffman et al. | |
| 7,323,356 B2 | 1/2008 | Hosono et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,674,650 B2 | 3/2010 | Akimoto et al. | |
| 7,732,819 B2 | 6/2010 | Akimoto et al. | |
| 8,482,005 B2 | 7/2013 | Yamazaki et al. | |
| 8,502,226 B2 | 8/2013 | Kondo et al. | |
| 2001/0046027 A1 | 11/2001 | Tai et al. | |
| 2002/0056838 A1 | 5/2002 | Ogawa | |
| 2002/0132454 A1 | 9/2002 | Ohtsu et al. | |
| 2003/0189401 A1 | 10/2003 | Kido et al. | |
| 2003/0218222 A1 | 11/2003 | Wager et al. | |
| 2004/0038446 A1 | 2/2004 | Takeda et al. | |
| 2004/0127038 A1 | 7/2004 | Carcia et al. | |
| 2005/0017302 A1 | 1/2005 | Hoffman | |
| 2005/0199959 A1 | 9/2005 | Chiang et al. | |
| 2006/0035452 A1 | 2/2006 | Carcia et al. | |
| 2006/0043377 A1 | 3/2006 | Hoffman et al. | |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0090365 A1 | 4/2007 | Hayashi et al. | |
| 2007/0097064 A1 * | 5/2007 | Okita et al. | 345/101 |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0252928 A1 | 11/2007 | Ito et al. | |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |
| 2008/0050595 A1 | 2/2008 | Nakagawara et al. | |
| 2008/0073653 A1 | 3/2008 | Iwasaki | |
| 2008/0079001 A1 * | 4/2008 | Umezaki et al. | 257/59 |
| 2008/0083950 A1 | 4/2008 | Pan et al. | |
| 2008/0084376 A1 * | 4/2008 | Hirota et al. | 345/88 |
| 2008/0106191 A1 | 5/2008 | Kawase | |
| 2008/0128689 A1 | 6/2008 | Lee et al. | |
| 2008/0129195 A1 | 6/2008 | Ishizaki et al. | |
| 2008/0166834 A1 | 7/2008 | Kim et al. | |
| 2008/0182358 A1 | 7/2008 | Cowdery-Corvan et al. | |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2009/0068773 A1 | 3/2009 | Lai et al. | |
| 2009/0073325 A1 | 3/2009 | Kuwabara et al. | |
| 2009/0091588 A1 * | 4/2009 | Chen et al. | 345/690 |
| 2009/0114910 A1 | 5/2009 | Chang | |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0278122 A1 | 11/2009 | Hosono et al. | |
| 2009/0280600 A1 | 11/2009 | Hosono et al. | |
| 2010/0065844 A1 | 3/2010 | Tokunaga | |
| 2010/0092800 A1 | 4/2010 | Itagaki et al. | |
| 2010/0109002 A1 | 5/2010 | Itagaki et al. | |
| 2011/0063337 A1 * | 3/2011 | Lin et al. | 345/690 |
| 2011/0090416 A1 | 4/2011 | Arasawa et al. | |
| 2011/0134345 A1 * | 6/2011 | Yamazaki et al. | 348/790 |
| 2012/0001881 A1 | 1/2012 | Miyake et al. | |
| 2012/0070084 A1 * | 3/2012 | Yu | 382/170 |
| 2012/0327141 A1 | 12/2012 | Yoshida | |
| 2013/0057600 A1 * | 3/2013 | Kim et al. | 345/691 |
| 2014/0104151 A1 | 4/2014 | Yamazaki et al. | |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2011-109081 | 6/2011 |
| JP | 2011-138118 | 7/2011 |
| WO | WO-2004/114391 | 12/2004 |

OTHER PUBLICATIONS

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

Ikeda.T et al., "Full-Functional System Liquid Crystal Display Using CG-Silicon Technology,", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxice Semiconductors,", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment,", Appl. Phys. Lett. (Applied Physics Letters) , Jun. 26, 2007, vol. 90, No. 26, pp. 262106-1-262106-3.

(56) References Cited

OTHER PUBLICATIONS

Takahashi.M et al., "Theoretical Analysis of Igzo Transparent Amorphous Oxide Semiconductor,", IDW '08 : Proceedings of the 15th International Display Workshops, Dec. 3, 2008, pp. 1637-1640.

Hayashi.R et al., "42.1: Invited Paper: Improved Amorphous IN-Ga-Zn-O TFTs,", SID Digest '08 : SID International Symposium Digest of Technical Papers, May 20, 2008, vol. 39, pp. 621-624.

Prins.M et al., "A Ferroelectric Transparent Thin-Film Transistor,", Appl. Phys. Lett. (Applied Physics Letters), Jun. 17, 1996, vol. 68, No. 25, pp. 3650-3652.

Nakamura.M et al., "The phase relations in the In2O3-Ga2ZnO4-ZnO system at 1350°C,", Journal of Solid State Chemistry, Aug. 1, 1991, vol. 93, No. 2, pp. 298-315.

Kimizuka.N et al., "Syntheses and Single-Crystal Data of Homologous Compounds, In2O3(ZnO)m (m = 3, 4, and 5), InGaO3(ZnO)3, and Ga2O3(ZnO)m (m = 7, 8, 9, and 16) in the In2O3-ZnGa2O4-ZnO System,", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor,", Science, May 23, 2003, vol. 300, No. 5623, pp. 1269-1272.

Masuda.S et al., "Transparent thin film transistors using ZnO as an active channel layer and their electrical properties,", J. Appl. Phys. (Journal of Applied Physics), Feb. 1, 2003, vol. 93, No. 3, pp. 1624-1630.

Asakuma.N et al., "Crystallization and Reduction of Sol-Gel-Derived Zinc Oxide Films by Irradiation with Ultraviolet Lamp,", Journal of Sol-Gel Science and Technology, 2003, vol. 26, pp. 181-184.

Osada.T et al., "15.2: Development of Driver-Integrated Panel using Amorphous In-Ga-Zn-Oxide TFT,", SID Digest '09 : SID International Symposium Digest of Technical Papers, May 31, 2009, pp. 184-187.

Nomura.K et al., "Carrier transport in transparent oxide semiconductor with intrinsic structural randomness probed using single-crystalline InGaO3(ZnO)5 films,", Appl. Phys. Lett. (Applied Physics Letters), Sep. 13, 2004, vol. 85, No. 11, pp. 1993-1995.

Li.O et al., "Modulated Structures of Homologous Compounds InMO3(ZnO)m (M=in,Ga; m=Integer) Described by Four-Dimensional Superspace Group,", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous Gizo (Ga2O3-In2O3-ZnO) TFT,", SID Digest '08 : SID International Symposium Digest of Technical Papers, May 20, 2008, pp. 633-636.

Lee.J et al., "World'S Largest (15-Inch) XGA AMLCD Panel Using Igzo Oxide TFT,", SID Digest '08 : SID International Symposium Digest of Technical Papers, May 20, 2008, pp. 625-628.

Nowatari.H et al., "60.2: Intermediate Connector With Suppressed Voltage Loss for White Tandem OLEDs,", SID Digest '09 : SID International Symposium Digest of Technical Papers, May 31, 2009, pp. 899-902.

Kanno.H et al., "White Stacked Electrophosphorecent Organic Light-Emitting Devices Employing MOO3 as a Charge-Generation Layer,", Adv. Mater. (Advanced Materials), 2006, vol. 18, No. 3, pp. 339-342.

Tsuda.K et al., "Ultra Low Power Consumption Technologies for Mobile TFT-LCDs ,", IDW '02 : Proceedings of the 9th International Display Workshops, Dec. 4, 2002, pp. 295-298.

Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.

Fung.T et al., "2-D Numerical Simulation of High Performance Amorphous In-Ga-Zn-O TFTs for Flat Panel Displays,", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium-Gallium-Zinc Oxide TFTs Array,", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure,", IEDM 09: Technical Digest of International Electron Devices Meeting, Dec. 7, 2009, pp. 191-194.

Kurokawa.Y et al., "UHF RFCPUS on Flexible and Glass Substrates for Secure RFID Systems,", Journal of Solid-State Circuits , 2008, vol. 43, No. 1, pp. 292-299.

Ohara.H et al., "Amorphous In-Ga-Zn-Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.

Cho.D et al., "21.2:Al and Sn-Doped Zinc Indium Oxide Thin Film Transistors for AMOLED Back-Plane,", SID Digest '09 : SID International Symposium Digest of Technical Papers, May 31, 2009, pp. 280-283.

Lee.M et al., "15.4:Excellent Performance of Indium-Oxide-Based Thin-Film Transistors by DC Sputtering,", SID Digest '09 : SID International Symposium Digest of Technical Papers, May 31, 2009, pp. 191-193.

Jin.D et al., "65.2:Distinguished Paper:World-Largest (6.5') Flexible Full Color Top Emission AMOLED Display on Plastic Film and Its Bending Properties,", SID Digest '09 : SID International Symposium Digest of Technical Papers, May 31, 2009, pp. 983-985.

Sakata.J et al., "Development of 4.0-in. AMOLED Display With Driver Circuit Using Amorphous In-Ga-Zn-Oxide TFTs,", IDW '09 : Proceedings of the 16th International Display Workshops, 2009, pp. 689-692.

Park.J et al., "Amorphous Indium-Gallium-Zinc Oxide TFTs and Their Application for Large Size AMOLED,", AM-FPD '08 Digest of Technical Papers, Jul. 2, 2008, pp. 275-278.

Park.S et al., "Challenge to Future Displays: Transparent AM-OLED Driven by Peald Grown ZnO TFT,", IMID '07 Digest, 2007, pp. 1249-1252.

Godo.H et al., "Temperature Dependence of Characteristics and Electronic Structure for Amorphous In-Ga-Zn-Oxide TFT,", AM-FPD '09 Digest of Technical Papers, Jul. 1, 2009, pp. 41-44.

Osada.T et al., "Development of Driver-Integrated Panel Using Amorphous In-Ga-Zn-Oxide TFT,", AM-FPD '09 Digest of Technical Papers, Jul. 1, 2009, pp. 33-36.

Hirao.T et al., "Novel Top-Gate Zinc Oxide Thin-Film Transistors (ZnO TFTs) for AMLCDs,", Journal of the SID, 2007, vol. 15, No. 1, pp. 17-22.

Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In-Ga-Zn-Oxide TFT,", SID Digest '09 : SID International Symposium Digest of Technical Papers, May 31, 2009, pp. 1110-1112.

Ohara.H et al., "21.3:4.0 in. QVGA AMOLED Display Using In-Ga-Zn-Oxide TFTs With a Novel Passivation Layer,", SID Digest '09 : SID International Symposium Digest of Technical Papers, May 31, 2009, pp. 284-287.

Miyasaka.M, "Suftla Flexible Microelectronics on Their Way to Business,", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.

(56) References Cited

OTHER PUBLICATIONS

Asaoka.Y et al., "29.1: Polarizer-Free Reflective LCD Combined With Ultra Low-Power Driving Technology,", SID Digest '09 : SID International Symposium Digest of Technical Papers, May 31, 2009, pp. 395-398.

Lee.H et al., "Current Status of, Challenges to, and Perspective View of AM-OLED ,", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalling Blue Phases for Display Application,", SID Digest '07 : SID International Symposium Digest of Technical Papers, 2007, vol. 38, pp. 1737-1740.

Nakamura.M, "Synthesis of Homologous Compound with New Long-Period Structure,", NIRIM Newsletter, Mar. 1, 1995, vol. 150, pp. 1-4.

Kikuchi.H et al., "Polymer-Stabilized Liquid Crystal Blue Phases,", Nature Materials, Sep. 2, 2002, vol. 1, pp. 64-68.

Kimizuka.N et al., "Spinel,YBFE2O4, and YB2FE3O7 Types of Structures for Compounds in the In2O3 and Sc2O3-A2O3-BO Systems [A; FE, GA, or AL; B: MG, MN, FE, NI, CU,or ZN] at Temperatures Over 1000°C,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.

Orita.M et al., "Mechanism of Electrical Conductivity of Transparent InGaZnO4,", Phys. Rev. B (Physical Review, B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. (Japanese Journal of Applied Physics) , 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties of Amorphous Indium-Gallium-Zinc Oxide Semiconductor Upon Exposure to Water,", Appl. Phys. Lett. (Applied Physics Letters) , 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies in ZnO,", Appl. Phys. Lett. (Applied Physics Letters) , 2005, vol. 87, pp. 122102-1-122102-3.

Oba.F et al., "Defect energetics in ZnO: A hybrid Hartree-Fock density functional study,", Phys. Rev. B. (Physical Review. B), 2008, vol. 77, pp. 245202-1-245202-6.

Orita.M et al., "Amorphous transparent conductive oxide InGaO3(ZnO)m (m<4):a Zn4s conductor,", Philosophical Magazine, 2001, vol. 81, No. 5, pp. 501-515.

Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.

Mo .Y et al., "Amorphous Oxide TFT Backplanes for Large Size AMOLED Displays,", IDW '08 : Proceedings of the 6th International Display Workshops, Dec. 3, 2008, pp. 581-584.

Kim.S et al., "High-Performance oxide thin film transistors passivated by various gas plasmas,", 214th ECS Meeting, 2008, No. 2317, ECS.

Clark.S et al., "First Principles Methods Using Castep,", Ze tschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.

Ueno.K et al., "Field-Effect Transistor on SrTiO3 With Sputtered Al2O3 Gate Insulator,", Appl. Phys. Lett. (Applied Physics Letters) , Sep. 1, 2003, vol. 83, No. 9, pp. 1755-1757.

\* cited by examiner k frame          k+1 frame k frame          k+1 frame

LCD OVERDRIVING USING DIFFERENCE BETWEEN AVERAGE VALUES OF GROUPS OF PIXELS BETWEEN TWO FRAMES

BACKGROUND OF THE INVENTION

1. Field of the Invention

The present invention relates to a liquid crystal display device and a driving method thereof.

The liquid crystal display device refers to a device including a liquid crystal element. The liquid crystal display device includes a driver circuit for driving a plurality of pixels, for example. The liquid crystal display device also includes a control circuit, a power source circuit, a signal generation circuit, and the like which are arranged on another substrate.

2. Description of the Related Art

Liquid crystal display devices have been commoditized as a result of recent technological innovation, and development thereof has still been actively promoted for higher value-added products.

Some of the added values for liquid crystal display devices are an increase in aperture ratio for power saving and an increase in definition for improvement of display quality. One of the means to achieve both higher aperture ratio and higher definition is to reduce the size of a capacitor included in a pixel as well as the pixel size (for example, see Patent Documents 1 and 2).

Patent Document 2 also discloses combination of overdriving and a structure for reducing the size of a capacitor. The combination of overdriving and the structure for reducing the size of a capacitor results in an improvement in the response time of liquid crystals which is lowered with a decrease in capacitance.

REFERENCES

Patent Documents

[Patent Document 1] Japanese Published Patent Application No. 2011-109081
[Patent Document 2] Japanese Published Patent Application No. 2011-138118

SUMMARY OF THE INVENTION

A liquid crystal display device generally employs an inversion driving method in order to prevent burn-in or the like due to degradation of liquid crystal elements. However, when the inversion driving is performed with a structure for reducing the size of a capacitor, the influence of parasitic capacitance becomes more significant than that of an intentionally provided capacitor, which causes a variation in contrast even when an image with the same gray level is displayed with the same video voltage. This variation largely differs between the first-half rows and the second-half rows in the row direction. Note that the row direction refers to a longitudinal direction of an area in which a gate line driver circuit of a liquid crystal display device is provided, and the column direction refers to a longitudinal direction of an area in which a source line driver circuit is provided.

In the case where a video voltage of a source line is inverted every frame period, the period of switching the polarity of the video voltage is different between a pixel in the last row which is in the second-half rows and a pixel in the first row which is in the first-half rows even when the same video voltage is applied to the source line, which probably causes the above difference. Therefore, in a liquid crystal display device in which a capacitor is reduced in size so as to reduce the capacitance, uniform contrast cannot be obtained even in the case where an image with the same gray level is displayed with the same video voltage, leading to lowering of display quality. This problem is serious particularly when overdriving is used to operate the liquid crystal display device because the voltage level of a source line greatly varies at the time of polarity inversion.

The above problem will be described in detail with reference to FIGS. 7A to 7C. FIG. 7A is a circuit diagram of a pixel included in a liquid crystal display device. A pixel 600 illustrated in FIG. 7A includes a transistor 601, a capacitor 602, and a liquid crystal element 603. A gate of the transistor 601 is connected to a gate line GL_i (i is an arbitrary natural number), one of a source and a drain of the transistor 601 is connected to a source line SL_j (j is an arbitrary natural number), and the other thereof is connected to a node Cpix. Note that the node Cpix denotes a pixel electrode of the liquid crystal element 603 and an electrode electrically connected to the pixel electrode.

The pixel 600 illustrated in FIG. 7A also includes a capacitor 604 and a capacitor 605 which are parasitic capacitance between the node Cpix and the source line SL_j and between the node Cpix and a source line SL_j+1, respectively. This parasitic capacitance is generated when electrodes overlap with each other or come close to each other, and is different from an intentionally provided capacitor.

In FIG. 7B, curved lines represent voltage levels GL, SL, and Vpix of the gate line GL_i, the source line SL_j, and the node Cpix illustrated in FIG. 7A, respectively, and also represent a luminance change LC with optical response of a liquid crystal element in the case of overdriving. In FIG. 7B, the vertical axis represents voltage and the horizontal axis represents time, and Vcom is a common voltage. Note that in FIG. 7B, as the luminance change LC comes close to the voltage level Vpix, a desired optical response can be obtained. It is also noted that in FIG. 7B, curved lines with the same voltage level are displaced from one another for convenience of explanation.

As illustrated in FIG. 7B, in overdriving, when the voltage level GL is H level, the voltage level SL is increased to a level (overdrive voltage) higher than a desired video voltage, and then switched to the video voltage. The voltage level Vpix changes according to the voltage level SL. The luminance change LC changes according to the voltage level Vpix. Note that the time required for a change in the voltage level Vpix is several tens to hundreds of microseconds, while the time required for a change in the luminance change LC is at least several milliseconds though it depends on the response time of the liquid crystal element.

FIG. 7C illustrates changes in the voltage level GL, the voltage level SL, the voltage level Vpix, and the luminance change LC in a pixel (m, y) in one of the second-half rows and a pixel (1, y) in one of the first-half rows among pixels arranged in m rows and n columns (m and n are each a natural number greater than or equal to 2, and y is an arbitrary natural number less than or equal to n).

Even when the same video voltage is applied to a source line, the period of switching the polarity of the video voltage differs between the first-half rows and the second-half rows. The problem caused by this will be described with reference to FIG. 7C. Note that in the case where pixels are arranged in m rows, the first-half rows refer to the first to x-th rows (x is a natural number greater than 1 and less than m), and the second-half rows refer to the (x+1)th to m-th rows. Note that the following description will be made on the assumption that x is m/2.

In FIG. 7C, the polarity of a video voltage is inverted between a writing period of the m-th row in a k-th frame period (k is a natural number) and a writing period of the first row in a (k+1)th frame period, and the voltage level GL, the voltage level SL, the voltage level Vpix, and the luminance change LC at that time are illustrated like in FIG. 7B. Note that in FIG. 7C, V_1, V_2, and V_m denote writing of video voltages to the pixels of the first row, the second row, and the m-th row, respectively.

As illustrated in FIG. 7C, in the k-th frame period, the writing of the video voltage to the pixel (1, y) including the luminance change LC is completed by V_m.

Description will be made on a specific example in which the luminance change LC in the pixel (1, y) in the k-th frame period is completed by the time of writing the video voltage to the pixel (m, y) in the k-th frame period. For example, it is assumed that the frame frequency is 60 Hz and the optical response time of a liquid crystal element is 8 ms. Then, one frame period is 16.7 ms; therefore, the optical response of the liquid crystal element is completed until the writing of the video voltage from the first row to the m/2-th row is completed. Accordingly, the luminance change LC, which changes according to the video voltage written to the pixel (1, y) in the k-th frame period, is completed by the time of writing the video voltage to the pixel (m, y) in the k-th frame period.

After the writing of the video voltage to the pixel (1, y) in the k-th frame period, the voltage level SL varies periodically when video voltages are written to the pixels from the first row to the m-th row, though it keeps the same polarity during the k-th frame period. At this time, the voltage level SL varies with the same polarity as a video voltage written to a pixel (1, n) if frame inversion driving or source line inversion driving is performed. Thus, even if the voltage level Vpix changes with a change in the voltage level SL when the video voltage is written to the pixel (1, n) in the k-th frame period, the voltage level Vpix varies at a desired voltage level or a level slightly higher than the desired voltage level, which allows a desired optical response of the liquid crystal element to be eventually obtained by the luminance change LC.

On the other hand, in the k-th frame period, the period of writing V_m in the pixel (m, y) including the luminance change LC is not completed by V_1 in the (k+1)th frame period. The luminance change LC in the writing V_m is not completed in the k-th frame period but further takes almost as much time as a writing period of a video voltage from the first row to the m/2-th row in the (k+1)th frame period.

The voltage level Vpix, which changes according to the V_m in the pixel (m, y) in the k-th frame period, changes with a change in the voltage level SL whose polarity is inverted and which is amplified by overdriving as illustrated by V_1 and V_2 in the (k+1)th frame period. Because of the voltage level SL whose polarity is opposite to that in the k-th frame period, the voltage level Vpix in the (k+1)th frame period varies periodically at a level lower than a desired level and is not kept at the voltage level based on the V_m in the k-th frame period. Therefore, a desired optical response of the liquid crystal element cannot be eventually obtained by the luminance change LC. The problem in that a desired optical response of the liquid crystal element cannot be eventually obtained by the luminance change LC becomes more serious in the latter rows which are considerably influenced by the subsequent frame period.

The change in the voltage level Vpix is caused by a capacitive coupling at the node Cpix between the capacitor 604 and the capacitor 605 in FIG. 7A. The influence of the capacitive coupling between the capacitor 604 and the capacitor 605 becomes apparent as the capacitance of the capacitor 602 is reduced.

In the case where general inversion driving is performed or the capacitor 602 has high capacitance, the voltage level Vpix hardly changes and has little influence. However, in the case where the capacitor 602 has low capacitance and an overdrive voltage is applied to the whole of the pixel portion by overdriving, the optical response of a liquid crystal element differs between pixels in the first-half rows and pixels in the second-half rows even when the same video voltage is written to the pixel portion. As a result, a variation in contrast is caused even when an image with the same gray level is displayed with the same video voltage.

In view of the above, an object of one embodiment of the present invention is to provide a liquid crystal display device and a driving method thereof, in which lowering of display quality due to parasitic capacitance generated in a pixel electrode can be prevented even when the capacitance of a pixel is reduced as much as possible in order to achieve a high aperture ratio.

One embodiment of the present invention is a liquid crystal display device including a pixel portion having pixels arranged in m rows and n columns (m and n are each a natural number greater than or equal to 2), and an overdrive voltage generation portion in which an overdrive voltage higher than a video voltage is generated and the overdrive voltage and the video voltage are applied to a pixel electrode of a pixel during a gate selection period. The overdrive voltage generation portion includes a video voltage comparator circuit in which an average of first video voltages applied to pixel electrodes of pixels in an (x+1)th row (x is a natural number greater than 1 and less than m) to an m-th row in a k-th frame period (k is a natural number) is compared with an average of second video voltages applied to pixel electrodes of pixels in a first row to an x-th row in a (k+1)th frame period for each row; and an overdrive voltage switching circuit in which when a difference obtained from the comparison in the video voltage comparator circuit is greater than or equal to a threshold value, the overdrive voltage in the (k+1)th frame period is switched to a first overdrive voltage, and when the difference obtained from the comparison in the video voltage comparator circuit is less than the threshold value, the overdrive voltage in the (k+1)th frame period is switched to a second overdrive voltage lower than the first overdrive voltage.

In the liquid crystal display device of one embodiment of the present invention, a semiconductor layer included in a transistor in the pixel portion is preferably an oxide semiconductor layer.

In the liquid crystal display device of one embodiment of the present invention, a capacitor in the pixel portion preferably has a static capacitance of 30 fF or lower.

One embodiment of the present invention is a method for driving a liquid crystal display device including pixels arranged in m rows and n columns (m and n are each a natural number greater than or equal to 2), and performing overdriving in which an overdrive voltage higher than a video voltage is applied to a pixel electrode of a pixel during a gate selection period, and then the video voltage is applied to the pixel electrode. The method for driving the liquid crystal display device includes the following steps: comparing an average of first video voltages applied to pixel electrodes of pixels in an (x+1)th row (x is a natural number greater than 1 and less than m) to an m-th row in a k-th frame period (k is a natural number) with an average of second video voltages applied to pixel electrodes of pixels in a first row to an x-th row in a (k+1)th frame period for each row; and performing overdriving in the (k+1)th frame period, with use of a first overdrive voltage when a difference obtained from the comparison is greater than or equal to a threshold value, and with use of a second overdrive voltage when the difference obtained from the comparison is less than the threshold value.

In the method for driving a liquid crystal display device of one embodiment of the present invention, frame inversion driving is preferably performed in the k-th frame period and the (k+1)th frame period.

In the method for driving a liquid crystal display device of one embodiment of the present invention, source line inversion driving is preferably performed in the k-th frame period and the (k+1)th frame period.

According to one embodiment of the present invention, it is possible to prevent lowering of display quality due to parasitic capacitance generated in a pixel electrode even when the capacitance of a pixel is reduced as much as possible in order to achieve a high aperture ratio.

BRIEF DESCRIPTION OF THE DRAWINGS

In the accompanying drawings:

FIGS. 10A1 and 10A2 are external views and FIG. 10B is a cross-sectional view of a liquid crystal display device;

DETAILED DESCRIPTION OF THE INVENTION

Figure 1A:
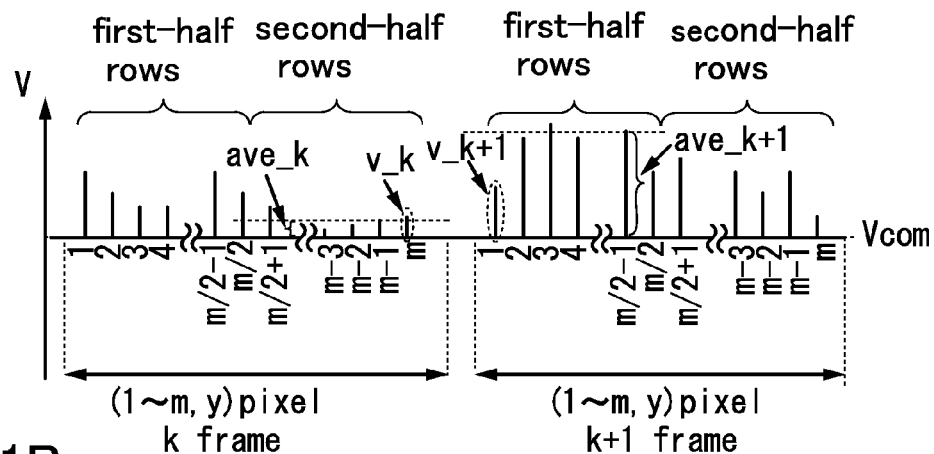
FIGS. 1A to 1C are schematic views showing the operation of a liquid crystal display device.

Hereinafter, embodiments will be described with reference to drawings. Note that the embodiments can be implemented with various modes, and it will be readily appreciated by those skilled in the art that modes and details can be changed in various ways without departing from the spirit and scope of the present invention. Thus, the present invention should not be interpreted as being limited to the following description of the embodiments.

In the reference drawings, the size, the thickness of layers, and/or regions may be exaggerated for clarity in some cases. Therefore, embodiments of the present invention are not limited to such scales. Note that drawings are schematic views of ideal examples, and the embodiments of the present invention are not limited to the shape or the value illustrated in the drawings. For example, variation in signal, voltage, or current due to noise or difference in timing can be included.

Note that in this specification and the like, a transistor is an element having at least three terminals of a gate, a drain, and a source. In addition, the transistor has a channel region between a drain (a drain terminal, a drain region, or a drain electrode) and a source (a source terminal, a source region, or a source electrode), and current can flow through the drain, the channel region, and the source.

Here, since the source and the drain of the transistor change depending on the structure, operating conditions, and the like of the transistor, it is difficult to define which is a source or a drain. Thus, a portion which functions as the source and a portion which functions as the drain are not called a source and a drain and one of the source and the drain is referred to as a first electrode and the other thereof is referred to as a second electrode in some cases.

Note that in this specification, ordinal numbers such as "first", "second", and "third" are used in order to avoid confusion among components, and the terms do not limit the components numerically.

Note that in this specification, when it is described that "A and B are connected to each other", the case where A and B are electrically connected to each other is included in addition to the case where A and B are directly connected to each other. Here, the description "A and B are electrically connected to each other" means the following case: when an object having any electrical function exists between A and B, an electric signal can be transmitted and received between A and B.

Note that in this specification, terms for describing arrangement, such as "over" and "under", are used for convenience for describing a positional relation between components with reference to drawings. Further, a positional relation between components is changed as appropriate in accordance with a direction in which each component is described. Thus, there is no limitation to terms used in this specification, and description can be made appropriately depending on the situation.

Note that positional relations of circuit blocks in block diagrams are specified for description, and even in the case where different circuit blocks have different functions, they may be provided in an actual circuit or region so that different functions are achieved in the same circuit or region. In addition, functions of circuit blocks in block diagrams are specified for description, and even in the case where one circuit block is illustrated, blocks may be provided in an actual circuit or region so that processing performed by one circuit block is performed by a plurality of circuit blocks.

Note that a pixel corresponds to a display unit controlling the luminance of one color component (e.g., any one of R (red), G (green), and B (blue)). Therefore, in a color display device, the minimum display unit of a color image is composed of three pixels of an R pixel, a G pixel and a B pixel. Note that the color of the color elements is not necessarily of three varieties and may be of three or more varieties or may include a color other than RGB.

(Embodiment 1)

Embodiment 1 will be described with reference to the drawings. Note that the order of description in this embodiment is as follows.

1. Basic principles of a liquid crystal display device disclosed in this specification
2. Inversion driving of the liquid crystal display device 3. Block diagram of the liquid crystal display device
4. Top structure and cross-sectional structure of a pixel
5. Details of components in the pixel
6. Modified examples of the top structure of the pixel
7. Liquid crystal display device disclosed in this specification <1. Basic Principles of a Liquid Crystal Display Device Disclosed in this Specification>

First, the basic principles for the present invention will be described.

The basic operation of one embodiment of the present invention can be explained using the schematic views of FIGS. 1A to 1C and FIGS. 2A to 2C.

Figure 1B:
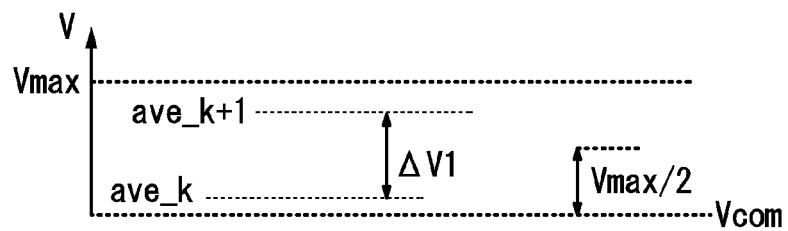
Figure 1C:
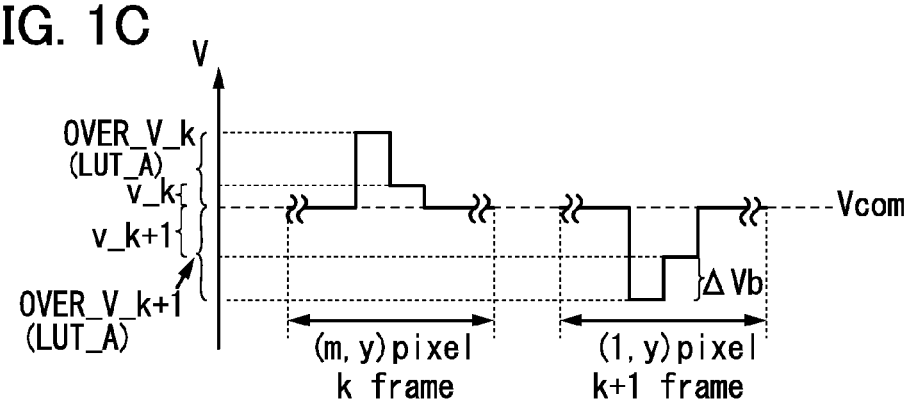

The structure illustrated in FIGS. 1A to 1C is as follows: the average of first video voltages applied to pixel electrodes of pixels in the second-half rows during a k-th frame period (k is a natural number) is compared with the average of second video voltages applied to pixel electrodes of pixels in the first-half rows during a (k+1)th frame period; and when a difference obtained from the comparison is greater than or equal to a threshold value, overdriving in the (k+1)th frame period is switched to a first overdrive voltage. In the structure illustrated in FIGS. 2A to 2C, when the aforementioned difference obtained from the comparison is less than the threshold value, overdriving in the (k+1)th frame period is switched to a second overdrive voltage lower than the first overdrive voltage.

FIG. 1A is a schematic view showing a change in video voltages applied to pixel electrodes of pixels in the same column during the k-th frame period and the (k+1)th frame period. The video voltages from the first row to an m-th row are arranged sequentially from the left. FIG. 1A shows a change in the video voltages from the first row to the m-th row in an arbitrary y-th column. Note that a longer bar represents a higher video voltage.

In this specification, the row direction is a longitudinal direction of an area in which a gate line driver circuit of a liquid crystal display device is provided, and the column direction is a longitudinal direction of an area in which a source line driver circuit is provided. The row direction and the column direction are illustrated in the drawings in some cases. Pixels in the same row refer to pixels connected to the same gate line, and pixels in the same column refer to pixels connected to the same source line.

Note that the first-half rows refer to the first to x-th rows (x is a natural number greater than 1 and less than m). The second-half rows refer to the (x+1)th to m-th rows. In FIG. 1A, x is m/2, so that the first-half rows are the first to m/2-th rows and the second-half rows are the (m/2+1)th to m-th rows. Note that the value of x which separates the first-half rows and the second-half rows may be determined in advance depending on, for example, the optical response time of a liquid crystal element.

In FIG. 1A, a video voltage applied to a pixel electrode of a pixel in the last row (m-th row) during the k-th frame period is denoted as V_k. Further, the average of video voltages (first video voltages) applied to pixel electrodes of pixels in the second-half rows during the k-th frame period is denoted as a voltage level ave_k.

Also in FIG. 1A, a video voltage applied to a pixel electrode of a pixel in the first row during the (k+1)th frame period is denoted as V_k+1. Further, the average of video voltages (second video voltages) applied to pixel electrodes of pixels in the first-half rows during the (k+1)th frame period is denoted as a voltage level ave_k+1.

The voltage level ave_k and the voltage level ave_k+1 described in FIG. 1A are juxtaposed in the schematic view of FIG. 1B. As described above, in the structure disclosed in this specification, the average of the first video voltages applied to the pixel electrodes of the pixels in the second-half rows during the k-th frame period is compared with the average of the second video voltages applied to the pixel electrodes of the pixels in the first-half rows during the (k+1)th frame period. Then, a difference obtained from the comparison is compared with a threshold value.

Specifically, in FIG. 1B, the voltage level ΔV1 which is the difference between the voltage level ave_k and the voltage level ave_k+1 is estimated and compared with the threshold value. Note that in the structure disclosed in this specification, the voltage level ΔV1 is used in order to determine the degree of change between the video voltages applied to the pixel electrodes of the pixels in the second half rows during the k-th frame period and the video voltages applied to the pixel electrodes of the pixels in the first half rows during the (k+1)th frame period. If this degree of change can be determined by a signal other than the video voltages, the voltage level ΔV1 is not necessarily estimated.

Note that in the description of this embodiment, a voltage level (Vmax/2) half a video voltage (Vmax) with the maximum grayscale value is used as the threshold value compared with a difference obtained from the comparison. Note that in the structure disclosed in this specification, the threshold value is not limited to the voltage level half the Vmax, and may be determined as appropriate in consideration of liquid crystal elements to be used, frame frequency, and the like.

In the specific example of FIG. 1B, the difference obtained from the comparison between the voltage level ave_k and the voltage level ave_k+1 is the voltage level ΔV1, and the voltage level ΔV1 is greater than or equal to the threshold value Vmax/2. Accordingly, overdriving in the (k+1)th frame period is switched to the first overdrive voltage.

FIG. 1C is a schematic view showing a waveform of overdriving using the first overdrive voltage based on the comparison in FIG. 1B. FIG. 1C shows a waveform at the time when the video voltage V_k applied to the pixel electrode of the pixel in the last row (m-th row) during the k-th frame period is overdriven, and a waveform at the time when the video voltage V_k+1 applied to the pixel electrode of the pixel in the first row during the (k+1)th frame period is overdriven.

In the schematic view of FIG. 1C, the overdrive voltage is determined from a first lookup table: an overdrive voltage OVER_V_k (LUT (A)) for the video voltage V_k, and an overdrive voltage OVER_V_k+1 (LUT (A)) for the video voltage V_k+1. Note that the overdrive voltage OVER_V_k+1 (LUT (A)) has a voltage level higher than the video voltage V_k+1 by ΔVb.

As shown in FIG. 1C, based on the comparison in FIG. 1B, the overdrive voltage OVER_V_k+1 (LUT (A)) for the video voltage V_k+1 is determined from the first lookup table. The overdrive voltage determined from the first lookup table is higher than that determined from a second lookup table described below.

The overdrive voltage determined from the first lookup table is preferably used in the case where a video voltage varies greatly during continuous frame periods; therefore, it is preferably used in the case where there is a large difference between the voltage level ave_k and the voltage level ave_k+1.

Figure 2A:
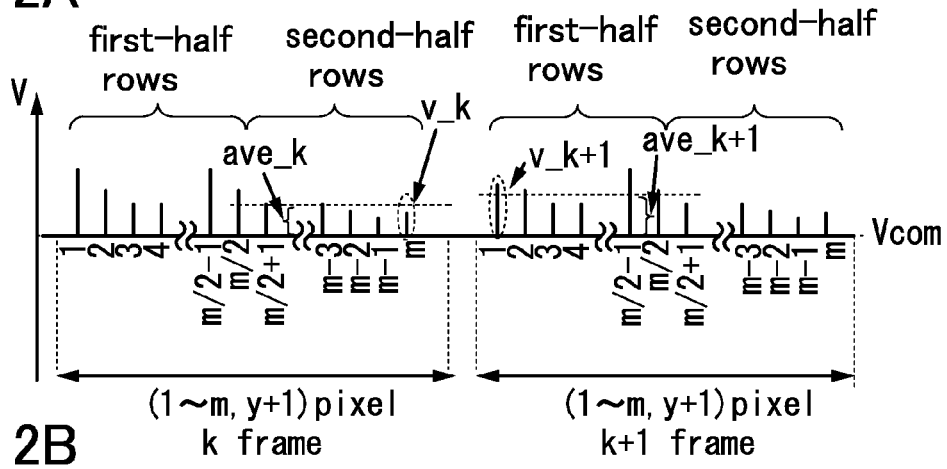
FIGS. 2A to 2C are schematic views showing the operation of a liquid crystal display device.

FIG. 2A is a schematic view showing, as in FIG. 1A, a change in video voltages applied to pixel electrodes of pixels in the same column during the k-th frame period and the (k+1)th frame period. The video voltages from the first row to the m-th row are arranged sequentially from the left. In FIG. 2A, an (y+1)th column is selected as an arbitrary column and video voltages during the k-th frame period and the (k+1)th frame period have different values from those in FIG. 1A. Consequently, the voltage level ave_k and the voltage level ave_k+1 in FIG. 2A are different from those in FIG. 1A. Note that in FIG. 2A, the video voltage V_k applied to the pixel electrode of the pixel in the last row (m-th row) during the k-th period and the video voltage V_k+1 applied to the pixel electrode of the pixel in the first row during the (k+1)th frame period are the same as those in FIG. 1A.

Figure 2B:
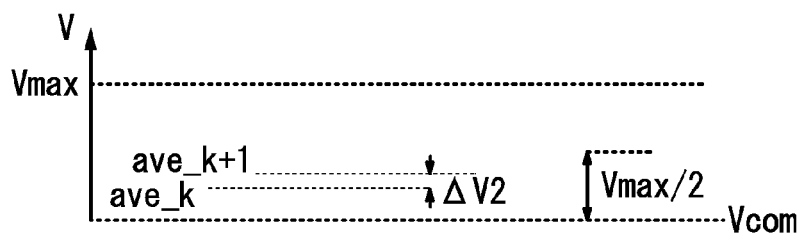

FIG. 2B is a schematic view in which the voltage level ave_k and the voltage level ave_k+1 described in FIG. 2A are juxtaposed as in FIG. 1B.

In a manner similar to that in FIG. 1B, a voltage level $\Delta V2$ is estimated and compared with a threshold value in FIG. 2B.

In the specific example of FIG. 2B, the difference obtained from the comparison between the voltage level ave_k and the voltage level ave_k+1 is the voltage level $\Delta V2$, and the voltage level $\Delta V2$ is smaller than the threshold value Vmax/2. Accordingly, overdriving in the (k+1)th frame period is switched to the second overdrive voltage.

Figure 2C:
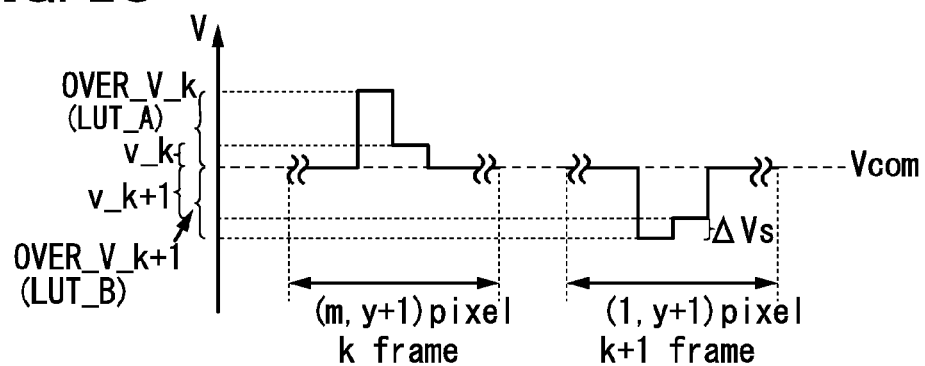

FIG. 2C is a schematic view showing a waveform of overdriving using the second overdrive voltage based on the comparison in FIG. 2B as in FIG. 1C.

In the schematic view of FIG. 2C, the overdrive voltage is determined from the second lookup table: an overdrive voltage OVER_V_k (LUT (A)) for the video voltage V_k, and an overdrive voltage OVER_V_k+1 (LUT (B)) for the video voltage V_k+1. Note that the overdrive voltage OVER_V_k+1 (LUT (B)) has a voltage level higher than the video voltage V_k+1 by $\Delta Vs$ which is lower than $\Delta Vb$ shown in FIG. 1C.

As shown in FIG. 2C, based on the comparison in FIG. 2B, the overdrive voltage OVER_V_k+1 (LUT (B)) for the video voltage V_k+1 is determined from the second lookup table. The overdrive voltage determined from the second lookup table is lower than that determined from the first lookup table.

The overdrive voltage determined from the second lookup table is preferably used in the case where a video voltage varies slightly during continuous frame periods; therefore, it is preferably used in the case where there is a small difference between the voltage level ave_k and the voltage level ave_k+1.

According to one embodiment of the present invention, as described with reference to the schematic views of FIGS. 1A to 1C and FIGS. 2A to 2C, the overdrive voltage can be switched to a different level based on the degree of change in the video voltage in continuous frame periods.

Figure 3:
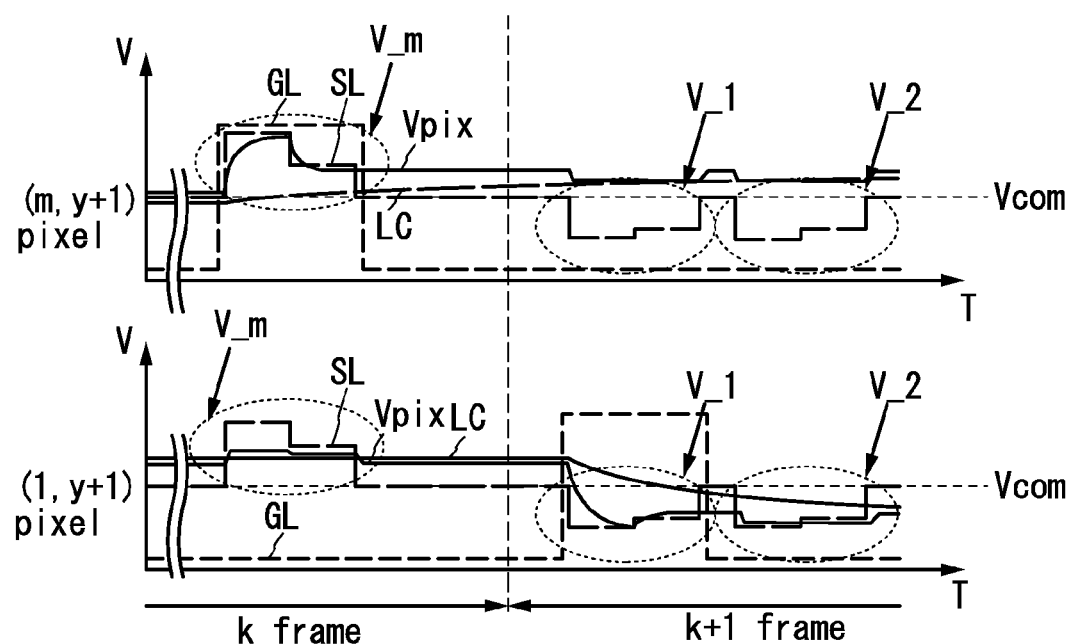
FIG. 3 is a diagram showing the operation of a liquid crystal display device.

The effect of one embodiment of the present invention will be specifically described with reference to the schematic view of FIG. 3. FIG. 3 illustrates, as FIG. 7C, changes in the voltage level GL, the voltage level SL, the voltage level Vpix, and the luminance change LC in a pixel (m, y+1) in one of the second-half rows and a pixel (1, y+1) in one of the first-half rows. FIG. 3 shows the case where the overdrive voltage is determined from the second lookup table as in FIGS. 2A to 2C.

Figure 7A:
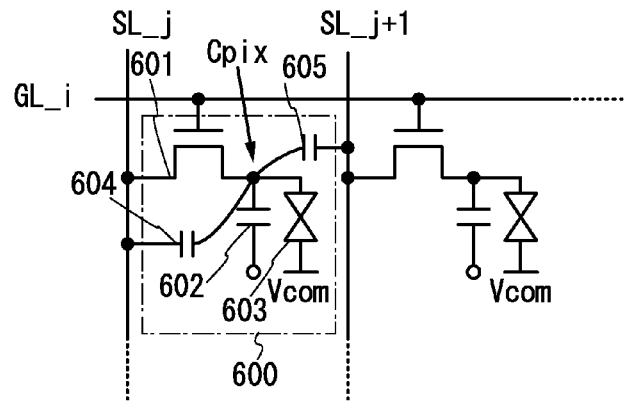
FIG. 7A is a circuit diagram and FIGS. 7B and 7C are schematic views each showing the operation of a liquid crystal display device.
Figure 7B:
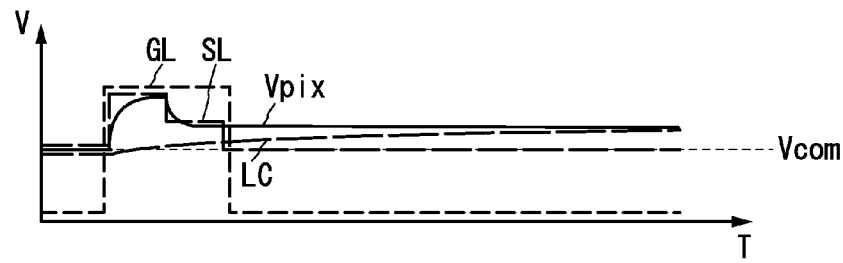
Figure 7C:
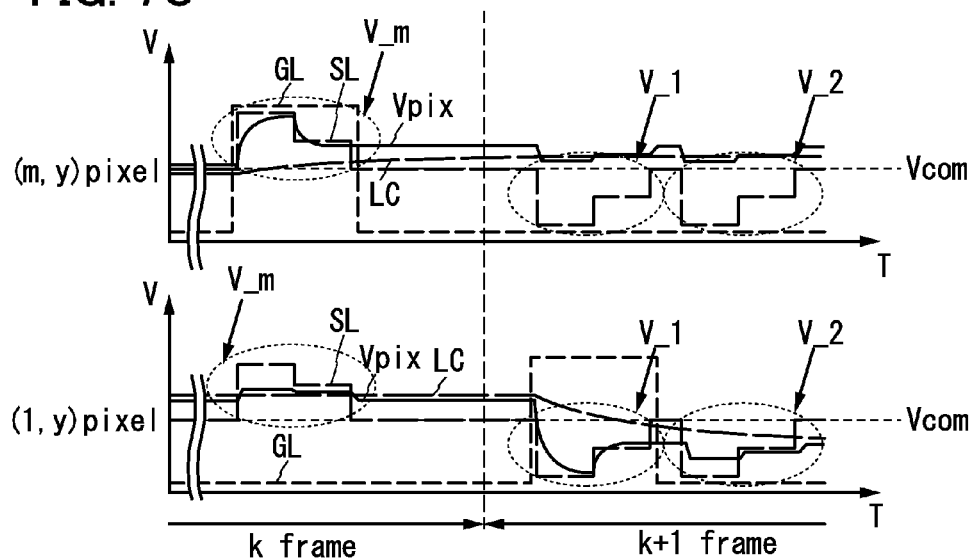

In FIG. 3, as described in FIG. 7C, the period of writing V_m in the pixel (m, y+1) including the luminance change LC in the k-th frame period is not completed by V_1 in the (k+1)th frame period. The luminance change LC in the writing V_m is not completed in the k-th frame period but further takes almost as much time as a writing period of a video voltage from the first row to the m/2-th row in the (k+1)th frame period, which corresponds to the writing period in the first-half rows described in FIGS. 1A to 1C and FIGS. 2A to 2C.

The voltage level Vpix, which changes according to the V_m in the pixel (m, y+1) in the k-th frame period, changes with a change in the voltage level SL whose polarity is inverted and which is amplified by overdriving as illustrated by V_1 and V_2 in the (k+1)th frame period.

According to one embodiment of the present invention, the overdrive voltage amplified by overdriving at this time can be switched to a different level based on the degree of change in the video voltage in continuous frame periods. Consequently, even when the voltage level Vpix in the (k+1)th frame period varies because of the voltage level SL whose polarity is opposite to that in the k-th frame period, the degree of variation can be reduced. As a result, it is possible to prevent the following defect described in FIG. 7C: the optical response of a liquid crystal element differs between pixels in the first-half rows and pixels in the second-half rows even when the same video voltage is written to the pixel portion, and a variation in contrast is caused even when an image with the same gray level is displayed with the same video voltage.

The aforementioned prevention of a variation in contrast is particularly effective in a liquid crystal display device in which a capacitor in a pixel has a low capacitance, for example, the pixel density is higher than or equal to 300 ppi, the aperture ratio is higher than or equal to 60%, and the capacitance in the pixel is lower than or equal to 30 fF ($3.0 \times 10^{-14}$ F). In other words, according to one embodiment of the present invention, both a high aperture ratio and a high definition can be achieved while lowering of display quality is prevented.

That is to say, according to one embodiment, even when the capacitance of a pixel is reduced as much as possible in order to achieve a high aperture ratio, lowering of display quality due to parasitic capacitance generated in a pixel electrode can be prevented.

<2. Inversion Driving of the Liquid Crystal Display Device>

Examples of the inversion driving in the liquid crystal display device include frame inversion driving, gate line inversion driving, source line inversion driving, and dot inversion driving. In one embodiment of the present invention, it is particularly preferable to employ the frame inversion driving and the source line inversion driving.

Figure 4A:
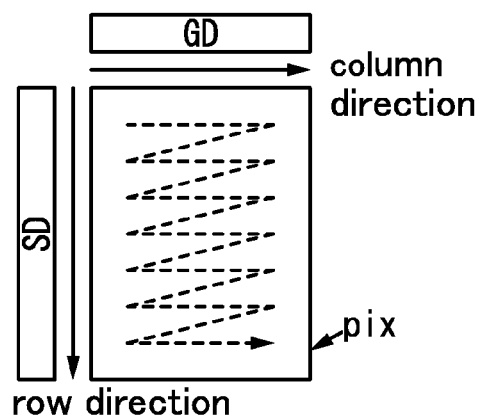
FIGS. 4A to 4C are block diagrams of a liquid crystal display device.

FIG. 4A is a schematic view of a liquid crystal display device for illustrating the inversion driving in the liquid crystal display device. FIG. 4A illustrates a source line driver circuit (SD), a gate line driver circuit (GD), and a pixel portion pix. Also in FIG. 4A, a row direction and a column direction are illustrated and a video voltage is written in the row direction. Note that in FIG. 4A, the row direction is a longitudinal direction of an area in which the gate line driver circuit of the liquid crystal display device is provided, and the column direction is a longitudinal direction of an area in which the source line driver circuit is provided.

Figure 4B:
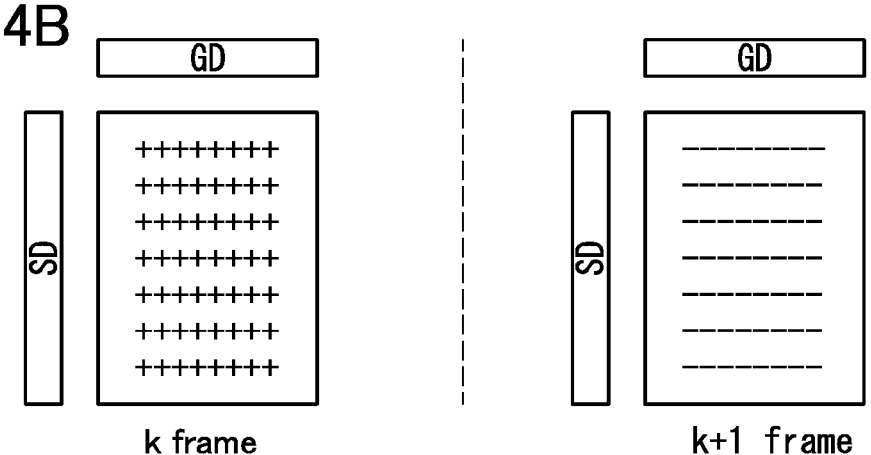

FIG. 4B is another schematic view of the liquid crystal display device illustrated in FIG. 4A, which shows a video voltage in each pixel when the frame inversion driving is performed in the k-th frame period and the (k+1)th frame period. As illustrated in FIG. 4B, a positive video voltage is applied to a pixel electrode of each pixel in the k-th frame period, and a negative video voltage is applied to the pixel electrode of each pixel in the (k+1)th frame period.

Figure 4C:
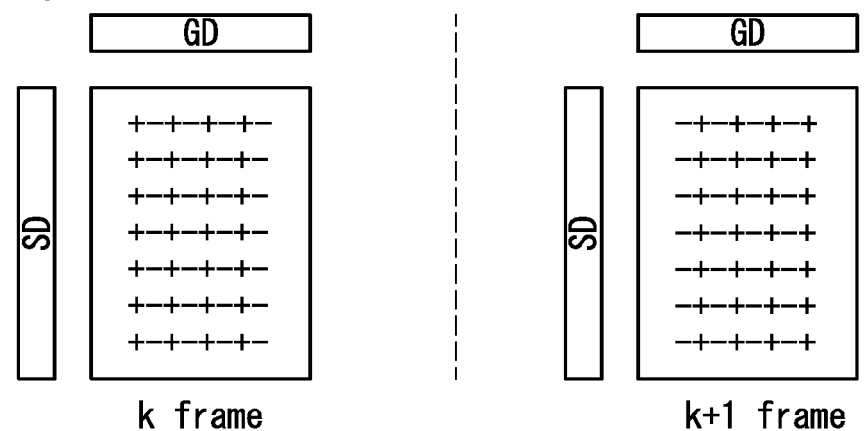

FIG. 4C is another schematic view of the liquid crystal display device illustrated in FIG. 4A, which shows a video voltage in each pixel when the source line inversion driving is performed in the k-th frame period and the (k+1)th frame period. As illustrated in FIG. 4C, in the k-th frame period, a positive video voltage is applied to a pixel electrode of each pixel in the odd-numbered columns and a negative video voltage is applied to a pixel electrode of each pixel in the even-numbered columns. In the (k+1)th frame period, a negative video voltage is applied to a pixel electrode of each pixel in the odd-numbered columns and a positive video voltage is applied to a pixel electrode of each pixel in the even-numbered columns.

Note that in FIGS. 4B and 4C, "+" represents a positive video voltage while "−" represents a negative video voltage.

Figure 5A:
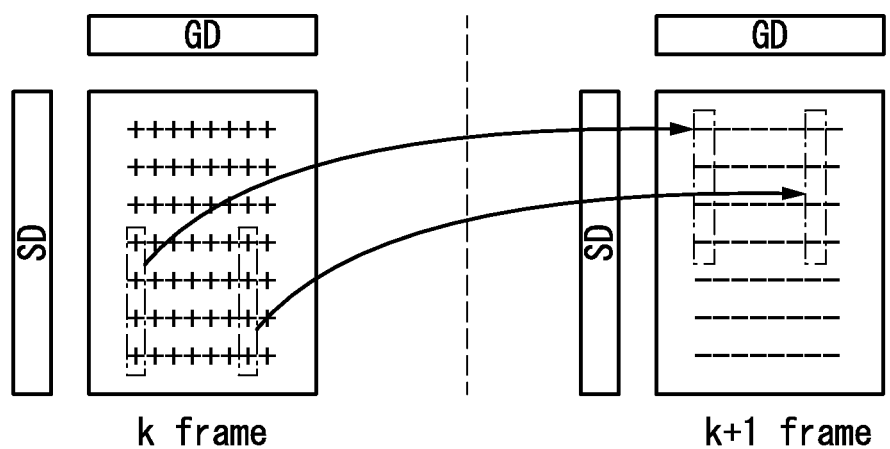
FIGS. 5A and 5B are schematic views showing the operation of a liquid crystal display device.
Figure 5B:
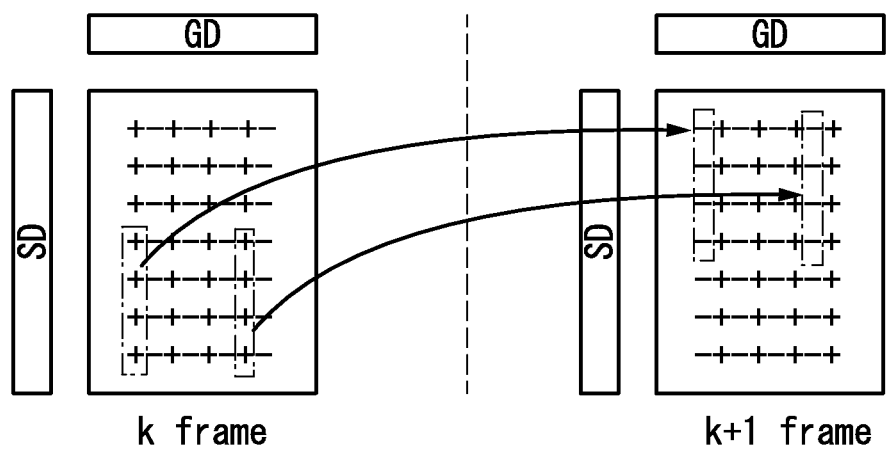

FIGS. 5A and 5B focus on video voltages which are inverted every column in the k-th frame period and the (k+1)th frame period by the frame inversion driving and the source line inversion driving illustrated in FIGS. 4B and 4C. As indicated by arrows in FIGS. 5A and 5B, the polarity of video voltages applied to pixel electrodes of pixels arranged in the column direction is inverted in continuous frame periods. Such a structure in which the polarity is inverted every frame period in the column direction is particularly effective for the aforementioned liquid crystal display device which has a low capacitance in a pixel and is largely influenced by parasitic capacitance.

It is thus effective that the frame inversion driving and the source line inversion driving employ the aforementioned structure of one embodiment of the present invention: the overdrive voltage amplified by overdriving is switched to a different level based on the degree of change in the video voltage in continuous frame periods.

Furthermore, in the source line inversion driving, the polarity of a video voltage is inverted between source lines adjacent to a pixel. Accordingly, the effect of a variation in the voltage level of a pixel electrode can be offset by video voltages with inverted polarity, whereby lowering of display quality can be further prevented.

Note that the frame inversion driving and the source line inversion driving may be combined with common inversion driving or the like as necessary.

<3. Block Diagram of the Liquid Crystal Display Device>

Figure 6A:
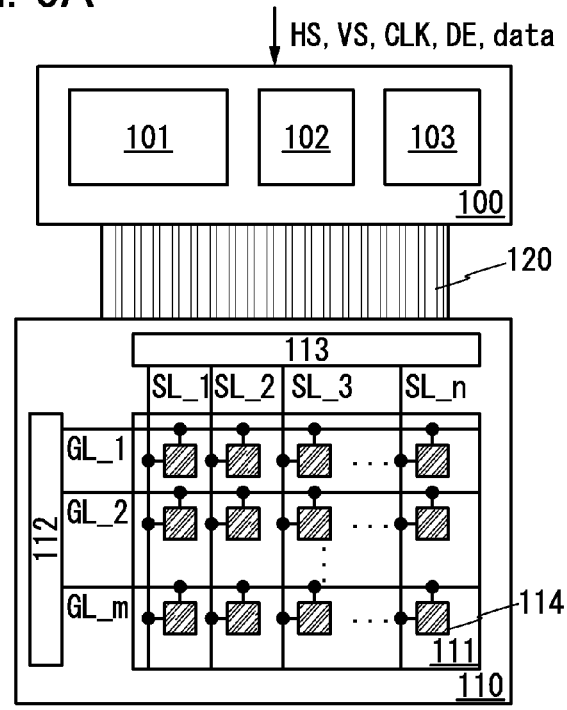
FIGS. 6A and 6B are schematic views showing the operation of a liquid crystal display device.

FIG. 6A is a block diagram showing the operation of the aforementioned liquid crystal display device. The liquid crystal display device can be roughly divided into a signal generation portion 100 and a display portion 110. Note that the signal generation portion 100 is electrically connected to the display portion 110 with a connecting unit such as an FPC 120.

The signal generation portion 100 generates a signal necessary for displaying an image in the display portion 110. In FIG. 6A, the signal generation portion 100 and the display portion 110 are provided on different substrates; however, they may be formed on the same substrate.

An image is displayed in the display portion 110 based on a signal generated in the signal generation portion 100.

Examples of the signal input to the signal generation portion include a data signal data, a horizontal synchronization signal HS, a vertical synchronization signal VS, a clock signal CLK, and a data control signal DE as illustrated in FIG. 6A. Another signal or a power source voltage may be input with these signals.

The signal generation portion 100 includes an overdrive voltage generation portion 101, a power source circuit 102, and a timing controller 103.

The overdrive voltage generation portion 101 determines an overdrive voltage for performing overdriving based on the data signal input thereto, and outputs the overdrive voltage to the display portion.

The power source circuit 102 generates a power source voltage for driving the signal generation portion 100 and the display portion 110 in accordance with a power source supplied externally. Note that the power source supplied externally may be home electrical power, a battery, or the like.

The timing controller 103 generates various kinds of control signals such as a start pulse and a clock signal for performing display in the display portion 110 in accordance with the horizontal synchronization signal HS, the vertical synchronization signal VS, the clock signal CLK, and the data control signal DE.

The display portion 110 includes a pixel portion 111, a gate line driver circuit 112, and a source line driver circuit 113. The pixel portion 111 includes a plurality of pixels 114. In the pixel 114, a desired image can be obtained by the optical response of a liquid crystal element with a scan signal supplied to gate lines GL_1 to GL_m connected to the gate line driver circuit 112, and an overdrive voltage and a video voltage which are applied to source lines SL_1 to SL_n connected to the source line driver circuit 113.

In the pixel portion 111, the gate lines GL_1 to GL_m are substantially perpendicular to the source lines SL_1 to SL_n. The pixel 114 is provided at the intersection of one of the gate lines and one of the source lines. In the case of color display, the pixels 114 corresponding to the respective colors of RGB are arranged in sequence in the pixel portion 111. Note that the pixels of RGB may be arranged in a stripe pattern, a mosaic pattern, a delta pattern, or the like as appropriate.

The gate line driver circuit 112 may include a shift register or the like, so that pulses can be sequentially output to the pixels 114 in accordance with a start pulse and a clock signal. The number of the gate lines GL_1 to GL_m may be determined depending on the number of the pixels 114; in FIG. 6A, m gate lines are provided because the pixels are arranged in m rows.

The source line driver circuit 113 may include a shift register or the like, so that a video voltage and an overdrive voltage can be sequentially output to the pixels 114. The number of the source lines SL_1 to SL_n may be determined depending on the number of the pixels 114; in FIG. 6A, n source lines are provided because the pixels are arranged in n columns.

In FIG. 6A, the pixels 114 are arranged in a matrix. Note that the pixel 114 may include a plurality of subpixels or the like, so that gate lines and source lines corresponding to the subpixels can be used for driving.

Figure 6B:
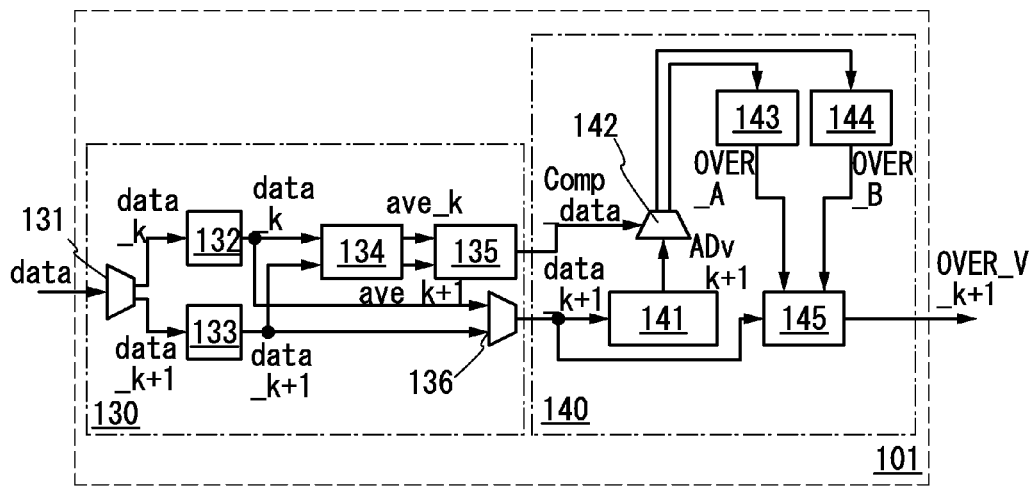

FIG. 6B illustrates a specific structure of the overdrive voltage generation portion 101.

The overdrive voltage generation portion 101 can be roughly divided into a video voltage comparator circuit 130 and an overdrive voltage switching circuit 140.

The video voltage comparator circuit 130 compares video voltages in continuous frame periods and outputs the comparison result. Although the video voltages are compared here, voltage values corresponding to digital signals are compared actually. Alternatively, other signals equivalent to the video voltages may be compared so that the comparison result is output. For example, the video voltage comparator circuit 130 may compare data signals which are digital signals corresponding to the video voltages.

The overdrive voltage switching circuit 140 determines an overdrive voltage based on the comparison result in the video voltage comparator circuit 130. For example, when the comparison result in the video voltage comparator circuit 130 indicates that the difference between video voltages based on compared data signals exceeds the threshold value, a normal overdrive voltage is determined and output; and when the comparison result indicates that the difference between video voltages based on compared data signals does not exceed the threshold value, an overdrive voltage lower than the normal overdrive voltage is determined and output.

The video voltage comparator circuit 130 includes a selection circuit 131, a storage circuit 132, a storage circuit 133, an arithmetic circuit 134, a comparator circuit 135, and a selection circuit 136.

The selection circuit 131 sorts data signals data input thereto for each frame period and stores the data signals in the storage circuit 132 and the storage circuit 133. The selection circuit 131 may include a demultiplexer or the like. In the block diagram of FIG. 6B, the data signal data is sorted into a data signal data_k in a k-th frame period and a data signal data_k+1 in a (k+1)th frame period, for example. Note that depending on the structures of the storage circuit 132 and the storage circuit 133, data signals in different frame periods may be stored in the same storage circuit and read separately.

The storage circuit 132 stores a data signal in one frame period. The block diagram of FIG. 6B shows an example in which the data signal data_k in the k-th frame period is stored as described above.

The storage circuit 133 stores a data signal in one frame period similarly to the storage circuit 132. The block diagram of FIG. 6B shows an example in which the data signal data_k+1 in the (k+1)th frame period is stored as described above. Alternatively, a plurality of storage circuits may be additionally provided so as to store a data signal in a subsequent frame period (e.g., a data signal in a (k+2)th frame period).

The arithmetic circuit 134 adds the data signals in the respective frame periods, which are stored in the storage circuit 132 and the storage circuit 133, and calculates the average. The average may be obtained by the arithmetic circuit 134 in the following manner: as described above, the first-half rows and the second-half rows are determined depending on the optical response time of a liquid crystal element; among the video voltages applied to pixels connected to the same source line, the data signal data_k in the k-th frame period used for calculation is read from the storage circuit 132, and the data signal data_k+1 in the (k+1)th frame period used for calculation is read from the storage circuit 132; then, the average of the video voltage is calculated. Note that in the arithmetic circuit 134, the data signal data_k and the data signal data_k+1 output from the storage circuit 132 and the storage circuit 133 may be converted into video voltages so that the average of the video voltage is calculated.

The comparator circuit 135 calculates the difference between the average of the video voltages in the k-th frame period and the average of the video voltages in the (k+1)th frame period, which are obtained in the arithmetic circuit, and compares the difference with a reference voltage which is to be a threshold value, thereby detecting whether a change in the voltage level in continuous frame periods is rapid or not. The comparison result is output as a comparison data signal Comp_data to the overdrive voltage switching circuit 140.

The selection circuit 136 selects a data signal in a frame period (here, the (k+1)th frame period) during which an overdrive voltage is determined between the data signal data_k in the k-th frame period and the data signal data_k+1 in the (k+1)th frame period, and outputs the data signal to the overdrive voltage switching circuit 140. The selection circuit 136 may include a multiplexer or the like.

The overdrive voltage switching circuit 140 includes a lookup table address generation circuit 141, a selection circuit 142, a lookup table 143, a lookup table 144, and an overdrive voltage arithmetic circuit 145.

The lookup table address generation circuit 141 generates a lookup table address ADv_k+1 indicating a lookup table which stores the overdrive voltage obtained based on the input data signal (in FIG. 6B, the data signal in the (k+1)th frame period). The lookup table address ADv_k+1 generated in the lookup table address generation circuit 141 is switched in the selection circuit 142 so as to be input to the lookup table 143 or the lookup table 144.

The selection circuit 142 sorts the lookup table address ADv_k+1 input thereto into the lookup table 143 or the lookup table 144 in accordance with the comparison data signal Comp_data. The selection circuit 142 includes a demultiplexer or the like.

In the aforementioned examples of FIGS. 1A to 1C and FIGS. 2A to 2C, when the difference between the averages of the video voltages compared in the comparison circuit 135 is greater than or equal to the threshold value, the first lookup table is selected so that the overdrive voltage is set higher, and when the difference between the averages of the video voltages compared in the comparison circuit 135 is less than the threshold value, the second lookup table is selected so that the overdrive voltage is set lower.

The lookup table 143 stores a compensation coefficient OVER_A corresponding to each bit, which is necessary for calculating a required overdrive voltage with use of the original video voltage. The compensation coefficient OVER_A is determined in advance so that a higher video voltage is compensated by a higher overdrive voltage.

Similarly to the lookup table 143, the lookup table 144 stores a compensation coefficient OVER_B corresponding to each bit, which is necessary for calculating a required overdrive voltage with use of the original video voltage. The compensation coefficient OVER_B is determined in advance so that a higher video voltage is compensated by a higher overdrive voltage. Note that as described above, the compensation coefficient OVER_A and the compensation coefficient OVER_B are determined in advance so as to obtain different overdrive voltages.

The overdrive voltage arithmetic circuit 145 performs interpolation of the original signal (in FIG. 6B, the data signal data_k+1 in the (k+1)th frame period) in accordance with the compensation coefficient OVER_A or the compensation coefficient OVER_B, thereby converting the original signal into the overdrive voltage OVER_V_k+1. Note that when the generation of the overdrive voltage OVER_V_k+1 is followed by output of the video voltage V_k+1 based on the original data signal data_k+1, a signal can be supplied to a pixel electrode of a pixel.

As described above, the block diagrams of FIGS. 6A and 6B have a structure including the pixel portion having pixels arranged in m rows and n columns, and the overdrive voltage generation portion in which an overdrive voltage higher than a video voltage is generated based on a video voltage and the overdrive voltage and the video voltage are supplied to a pixel electrode of a pixel during a gate selection period.

In addition, the block diagrams of FIGS. 6A and 6B have a structure in which the overdrive voltage generation portion includes a video voltage comparator circuit in which an average of first video voltages supplied to pixel electrodes of pixels in the second-half rows in a k-th frame period (k is a natural number) is compared with an average of second video voltages supplied to pixel electrodes of pixels in the first-half rows in a (k+1)th frame period for each row; and an overdrive voltage switching circuit in which when a difference obtained from the comparison in the video voltage comparator circuit is greater than or equal to a threshold value, the overdrive voltage in the (k+1)th frame period is switched to a first overdrive voltage, and when the difference obtained from the comparison in the video voltage comparator circuit is less than the threshold value, the overdrive voltage in the (k+1)th frame period is switched to a second overdrive voltage lower than the first overdrive voltage.

Further in the liquid crystal display device illustrated in FIGS. 6A and 6B, an average of first video voltages applied to pixel electrodes of pixels in the second-half rows in a k-th frame period (k is a natural number) is compared with an average of second video voltages applied to pixel electrodes of pixels in the first-half rows in a (k+1)th frame period for each row; and when a difference obtained from the comparison is greater than or equal to a threshold value, overdriving is performed with use of a first overdrive voltage in the (k+1)th frame period, and when the difference obtained from the comparison is less than the threshold value, overdriving is performed with use of a second overdrive voltage lower than the first overdrive voltage.

Accordingly, even when the capacitance of a pixel is reduced as much as possible in order to achieve a high aperture ratio, lowering of display quality due to parasitic capacitance generated in a pixel electrode can be prevented.

<4. Top Structure and Cross-Sectional Structure of a Pixel>

Figure 8A:
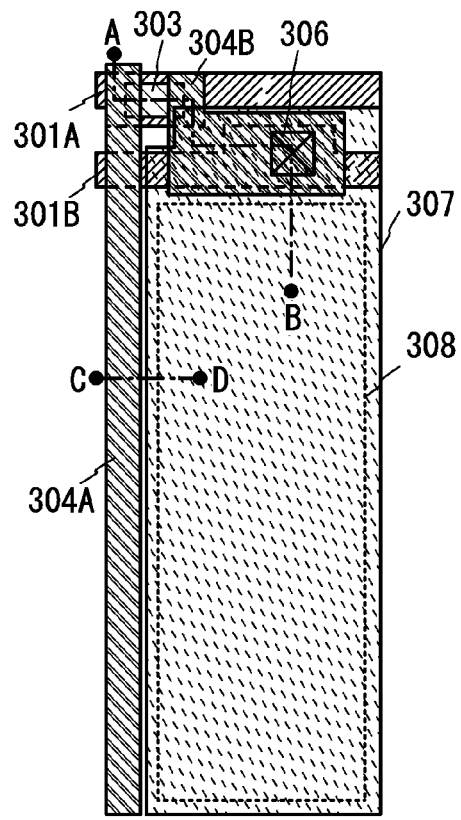
FIG. 8A is a top view and FIGS. 8B and 8C are cross-sectional views of a liquid crystal display device.
Figure 8B:
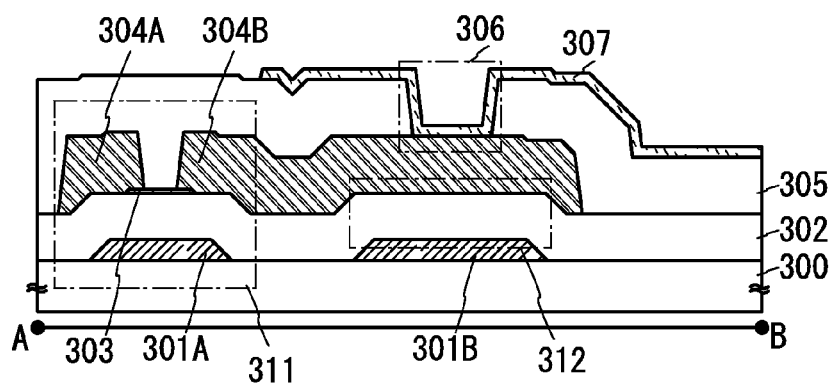
Figure 8C:
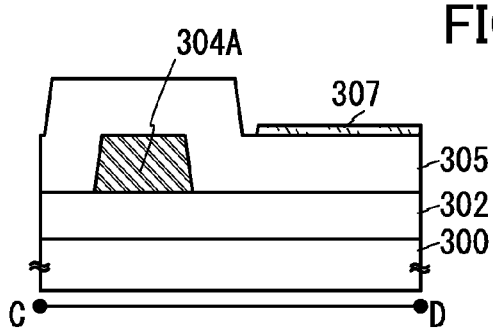

Next, a specific structure of a pixel included in the liquid crystal display device will be described with reference to FIGS. 8A to 8C. FIG. 8A is a top view of a pixel. FIG. 8B is a cross-sectional view taken along dashed-dotted line A-B of FIG. 8A. FIG. 8C is a cross-sectional view taken along dashed-dotted line C-D of FIG. 8A. Note that in FIGS. 8A to 8C, elements such as a liquid crystal and a counter electrode are omitted for simplicity of the drawings.

The top view of FIG. 8A illustrates a conductive layer 301A serving as a gate electrode or a gate line, a conductive layer 301B serving as a capacitor line and a first electrode of a capacitor, a semiconductor layer 303, a conductive layer 304A serving as a source line or a source electrode, a conductive layer 304B serving as a drain electrode and a second electrode of the capacitor, an opening 306 for connecting the conductive layer 304B and a pixel electrode, a conductive layer 307 serving as the pixel electrode, and an opening 308.

The conductive layers 301A and 301B extend in the direction substantially perpendicular to the conductive layer 304A (in FIG. 8A, the horizontal direction). The conductive layer 304A extends in the direction substantially perpendicular to the conductive layers 301A and 301B (in FIG. 8A, the vertical direction).

FIG. 8B illustrates the cross section along dashed-dotted line A-B of FIG. 8A, and FIG. 8C illustrates the cross section along dashed-dotted line C-D of FIG. 8A.

The cross-sectional structures along dashed-dotted lines A-B and C-D are as follows. The conductive layer 301A partly serving as a gate electrode of a transistor 311, and the conductive layer 301B serving as a first electrode of a capacitor 312 are provided over a substrate 300. An insulating layer 302 serving as a gate insulating film of the transistor 311 is provided over the conductive layers 301A and 301B. A semiconductor layer 303 is provided over a part of the insulating layer 302 which overlaps with the conductive layer 301A. The conductive layer 304A serving as a source electrode of the transistor 311, and the conductive layer 304B serving as a second electrode of the capacitor 312 and a drain electrode of the transistor 311 are provided over the conductive layer 301B, the insulating layer 302, and the semiconductor layer 303. An insulating layer 305 serving as a protective insulating film of the transistor 311 is provided over the insulating layer 302, the semiconductor layer 303, and the conductive layers 304A and 304B. The insulating layer 305 includes the opening 306 reaching the conductive layer 304B, and the conductive layer 307 serving as a pixel electrode is provided over the opening 306 and the insulating layer 305.

Although not illustrated, a light-shielding film is provided over the conductive layer 307 so as to block light in the region other than the opening 308 in FIG. 8A. A light-transmitting conductive film is provided as a counter electrode covering the light-shielding film. Note that an alignment film is provided over the conductive layer 307 and the counter electrode as necessary. A liquid crystal is provided between the conductive layer 307 and the counter electrode.

Here, the features of the transistor 311 including an oxide semiconductor are described. The transistor including an oxide semiconductor is an n-channel transistor. Further, oxygen vacancies in the oxide semiconductor might generate carriers. This might degrade the electrical characteristics and reliability of the transistor. For example, in some cases, the threshold voltage of the transistor is shifted in a negative direction, and drain current flows when gate voltage is 0 V. A transistor in which drain current flows when gate voltage is 0 V is referred to as a normally-on transistor, whereas a transistor in which substantially no drain current flows when gate voltage is 0 V is referred to as a normally-off transistor.

In view of the above, when an oxide semiconductor film is used, it is preferable that defects, typically oxygen vacancies in the oxide semiconductor film be reduced as much as possible. For example, it is preferable that the spin density of the oxide semiconductor film (the density of defects in the oxide semiconductor film) at a g-value of 1.93 in electron spin resonance spectroscopy in which a magnetic field is applied in parallel to the film surface be reduced to lower than or equal to the lower detection limit of measurement equipment. When the defects, typically the oxygen vacancies in the oxide semiconductor film are reduced as much as possible, the transistor can be prevented from being normally on, leading to an improvement in the electrical characteristics and reliability of the liquid crystal display device.

The shift of the threshold voltage of a transistor in a negative direction is caused in some cases by hydrogen (including a hydrogen compound such as water) contained in an oxide semiconductor film as well as by oxygen vacancies. Hydrogen contained in the oxide semiconductor film reacts with oxygen bonded to a metal atom to be water and forms vacancies (also referred to as oxygen vacancies) in a lattice from which oxygen is released (or a portion from which oxygen is released). In addition, the reaction of part of hydrogen and oxygen causes generation of electrons serving as carriers. Thus, a transistor including an oxide semiconductor film that contains hydrogen is likely to be normally on.

Accordingly, it is preferable that hydrogen be reduced as much as possible in the semiconductor layer 303 of the transistor 311. Specifically, the concentration of hydrogen in the semiconductor layer 303 that is measured by secondary ion mass spectrometry (SIMS) is lower than $5\times10^{18}$ atoms/cm$^3$, preferably lower than or equal to $1\times10^{18}$ atoms/cm$^3$, more preferably lower than or equal to $5\times10^{17}$ atoms/cm$^3$, and still more preferably lower than or equal to $1\times10^{16}$ atoms/cm$^3$.

Further, the concentration of an alkali metal or an alkaline earth metal in the semiconductor layer 303 that is measured by SIMS is lower than or equal to $1\times10^{18}$ atoms/cm$^3$, preferably lower than or equal to $2\times10^{16}$ atoms/cm$^3$. When an alkali metal or an alkaline earth metal is bonded to an oxide semiconductor, carriers are generated in some cases. This might lead to an increase in the off-state current of the transistor.

Further, when nitrogen is contained in the oxide semiconductor, electrons serving as carriers are generated and carrier density is increased, so that the oxide semiconductor film easily becomes n-type. As a result, a transistor including the oxide semiconductor film that contains nitrogen is likely to be normally on. For this reason, nitrogen in the semiconductor layer 303 is preferably reduced as much as possible. The concentration of nitrogen is preferably, for example, lower than or equal to $5\times10^{18}$ atoms/cm$^3$.

Further, when a Group 14 element such as silicon and carbon is contained in the oxide semiconductor film, electrons serving as carriers are generated and carrier density is increased, so that the oxide semiconductor film easily becomes n-type. Thus, in the transistor including the oxide semiconductor film, in particular, at the interface between the insulating layer 302 (not illustrated in FIG. 8A) and the semiconductor layer 303, the concentration of silicon that is measured by SIMS is lower than or equal to $3\times10^{18}$ atoms/cm$^3$, preferably lower than or equal to $3\times10^{17}$ atoms/cm$^3$. Note that at an interface, the concentration of carbon that is measured by SIMS is lower than or equal to $3\times10^{18}$ atoms/cm$^3$, preferably lower than or equal to $3\times10^{17}$ atoms/cm$^3$.

As described above, by using the semiconductor layer 303 that is highly purified by reducing impurities (e.g., hydrogen, nitrogen, silicon, carbon, an alkali metal, and an alkaline earth metal) as much as possible, the transistor 311 can be prevented from being normally on, so that the off-state current of the transistor 311 can be significantly reduced. Thus, one embodiment of the present invention is a liquid crystal display device having favorable electrical characteristics and high reliability. Note that the highly purified oxide semiconductor can be regarded as an intrinsic semiconductor or a substantially intrinsic semiconductor.

In addition, the transistor 311 is an enhancement transistor, and the semiconductor layer 303 is an oxide semiconductor film on which impurity addition treatment for increasing conductivity by intentionally increasing carrier density is not performed. Thus, the carrier density of the semiconductor layer 303 is equal to or lower than $1\times10^{17}$/cm$^3$, equal to or lower than $1\times10^{16}$/cm$^3$, equal to or lower than $1\times10^{15}$/cm$^3$, equal to or lower than $1\times10^{14}$/cm$^3$, or equal to or lower than $1\times10^{13}$/cm$^3$.

Note that various experiments can prove low off-state current of a transistor including a highly-purified oxide semiconductor film. For example, even when an element has a channel width of $1\times10^6$ μm and a channel length L of 10 μm, off-state current can be lower than or equal to the measurement limit of a semiconductor parameter analyzer, i.e., lower than or equal to $1\times10^{-13}$ A, at a voltage (drain voltage) across a source and a drain of 1 V to 10 V. In that case, it can be seen that off-state current corresponding to a value obtained by division of the off-state current by the channel width of the transistor is lower than or equal to 100 zA/μm. In addition, a capacitor and a transistor were connected to each other and off-state current was measured using a circuit in which electric charge flowing to or from the capacitor is controlled by the transistor. In the measurement, a highly-purified oxide semiconductor film was used in the channel formation region of the transistor, and the off-state current of the transistor was measured from a change in the amount of electric charge of the capacitor per unit hour. As a result, it can be seen that, in the case where the voltage across a source electrode and a drain electrode of the transistor is 3 V, a lower off-state current of several tens of yoctoamperes per micrometer is obtained. Accordingly, the transistor including the highly-purified oxide semiconductor film has extremely low off-state current.

Figure 12:
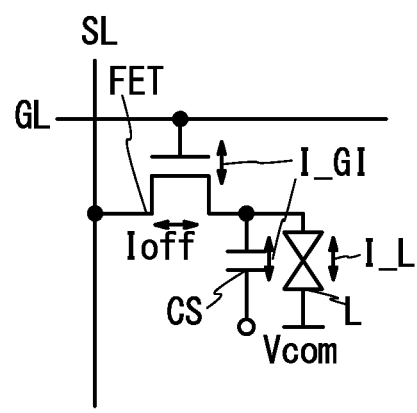
FIG. 12 is a diagram showing the operation of a liquid crystal display device.

Note that the amount of off-state current of a transistor in a pixel has the following effect on display quality when a capacitor is intentionally omitted. FIG. 12 illustrates a simple circuit structure of a pixel. FIG. 12 shows a source line SL, a gate line GL, a transistor FET, a capacitor Cs, and a liquid crystal element L.

Arrows illustrated in FIG. 12 indicate leakage current: off-state current Ioff flowing through the transistor FET, leakage current I_GI flowing through an insulating film serving as a gate insulating film of the transistor FET, and leakage current I_L flowing through the liquid crystal element L.

In the case of a transistor including an oxide semiconductor in a semiconductor layer, the off-state current Ioff is less than or equal to 100 zA/μm ($1\times10^{-19}$ A/μm) as described above. Further, the leakage current I_GI is less than or equal to 1 aA/μm ($1\times10^{-18}$ A/μm). The leakage current I_L is less than or equal to 1 aA/μm in twisted nematic (TN) liquid crystal, for example.

The video voltage V held in the pixel electrode of the pixel is changed by leakage current I leaked from the pixel. The voltage V can be estimated from Formula 1. In Formula 1, T denotes holding time and C denotes the capacitance.

$$V=(I\times T)/C \qquad (1)$$

In Formula 1, the capacitance C is 0.1 pF ($1\times10^{-13}$ F). At this time, when I=10 aA ($1\times10^{-17}$ A) and T=1/60 s at a frame frequency of 60 Hz, the changing voltage V is approximately $10^{-6}$ V, and thus a change in gray level due to leakage current does not cause a serious problem.

Assuming that the capacitance C is 1 fF ($1.0\times10^{-15}$ A) in consideration of parasitic capacitance generated in the pixel electrode in the case where a capacitor is intentionally omitted, the changing voltage V is approximately $1\times10^{-4}$ V, and thus the change in gray level due to leakage current I does not cause a serious problem.

In the case where a pixel includes a transistor containing amorphous silicon in a semiconductor layer, the off-state current I of the transistor is approximately $1\times10^{-13}$ A. At this time, when the capacitance C is approximately 1 fF ($1.0\times10^{-15}$ A), and I is 100 fA ($1\times10^{-13}$ A) and T is 1/60 s at a frame frequency of 60 Hz, the changing voltage V is approximately several volts, and thus the change in gray level due to leakage current is not negligible.

Thus, in this embodiment, the transistor in a pixel includes an oxide semiconductor in a semiconductor layer, and has a lower off-state current than a transistor including amorphous silicon in a semiconductor layer. The use of the transistor including an oxide semiconductor and having low off-state current leads to a reduction in the change in gray level due to the leakage current I.

As described above, the transistor in a pixel in the liquid crystal display device disclosed in this specification has low off-state current when an oxide semiconductor is used for a semiconductor layer. When a transistor having low off-state current is used as a switching element, a video voltage which has been written to a pixel electrode in the pixel varies only slightly due to off-state current even when the video voltage is retained for a long time. Accordingly, in the liquid crystal display device using a transistor including an oxide semiconductor layer, images can be displayed without decreasing display quality even when a capacitor has a low capacitance.

<Details of Components in the Pixel>

The top view of FIG. 8A and the cross-sectional views of FIGS. 8B and 8C will be described in detail below.

Although there is no particular limitation on the material and the like of the substrate 300, it is necessary that the substrate 300 have heat resistance high enough to withstand at least heat treatment performed in a manufacturing process of a liquid crystal display device. Examples of the substrate are a glass substrate, a ceramic substrate, and a plastic substrate, and as the glass substrate, an alkali-free glass substrate such as a barium borosilicate glass substrate, an aluminoborosilicate glass substrate, or an aluminosilicate glass substrate is preferably used.

The conductive layers 301A and 301B, through which a large amount of current flows, are preferably formed using a metal film; typically, they are formed to have a single-layer structure or a stacked-layer structure using any of metal materials such as molybdenum (Mo), titanium (Ti), tungsten (W), tantalum (Ta), aluminum (Al), copper (Cu), chromium (Cr), neodymium (Nd), or scandium (Sc), or an alloy material which contains any of these materials as its main component.

Examples of the conductive layers 301A and 301B are a single-layer structure using aluminum containing silicon, a two-layer structure in which titanium is stacked over aluminum, a two-layer structure in which titanium is stacked over titanium nitride, a two-layer structure in which tungsten is stacked over titanium nitride, a two-layer structure in which tungsten is stacked over tantalum nitride, a two-layer structure in which copper is stacked over Cu—Mg—Al alloy, and a three-layer structure in which titanium nitride, copper, and tungsten are stacked in this order.

The conductive layers 301A and 301B are preferably formed using aluminum or copper, which are low resistance materials. With the use of aluminum or copper, signal delay can be reduced, so that image quality can be improved. Note that aluminum has low heat resistance, and thus a defect due to hillocks, whiskers, or migration is easily generated. In order to prevent migration of aluminum, a layer of a metal material having a higher melting point than aluminum, such as molybdenum, titanium, or tungsten, is preferably stacked over an aluminum layer. Also in the case where copper is used, in order to prevent a defect due to migration and diffusion of copper elements, a layer of a metal material having a higher melting point than copper, such as molybdenum, titanium, or tungsten, is preferably stacked over a copper layer.

Further, as illustrated in FIGS. 8A and 8B, the conductive layer 301A preferably has such a shape that the semiconductor layer 303 can be provided in the region of the conductive layer 301A. As a result, the conductive layer 301A blocks light from a light source such as a backlight, whereby change or degradation of the electrical characteristics of the transistor 311 (e.g., threshold voltage) can be suppressed.

The insulating layer 302 is formed to have a single-layer structure or a stacked-layer structure using, for example, one or more of insulating materials such as silicon oxide, silicon oxynitride, silicon nitride oxide, silicon nitride, aluminum oxide, hafnium oxide, gallium oxide, and a Ga—Zn-based metal oxide. Note that in order to improve the characteristics of the interface between the insulating layer 302 and the semiconductor layer 303, a region in the insulating layer 302, which is in contact with at least the semiconductor layer 303, is preferably formed using an oxide insulating film.

When the insulating layer 302 is provided with an insulating film having a barrier property against oxygen, hydrogen, water, and the like, it is possible to prevent diffusion of oxygen from the semiconductor layer 303 to the outside and entry of hydrogen, water, or the like into the semiconductor layer 303 from the outside. Examples of the insulating film having a barrier property against oxygen, hydrogen, water, and the like, include an aluminum oxide film, an aluminum oxynitride film, a gallium oxide film, a gallium oxynitride film, an yttrium oxide film, an yttrium oxynitride film, a hafnium oxide film, a hafnium oxynitride film, and a silicon nitride film.

Moreover, it is preferable that the insulating layer 302 have the following stacked-layer structure: a silicon nitride film with a small number of defects as a first silicon nitride film; a silicon nitride film with small amounts of released hydrogen and released ammonia as a second silicon nitride film over the first silicon nitride film; and any one of the oxide insulating films given above as examples of the insulating layer 302 over the second silicon nitride film.

Preferably used as the second silicon nitride film is a nitride insulating film which releases less hydrogen molecules than $5\times10^{21}$ molecules/cm$^3$, preferably less than or equal to $3\times10^{21}$ molecules/cm$^3$, and more preferably less than or equal to $1\times10^{21}$ molecules/cm$^3$, and less ammonia molecules than $1\times10^{22}$ molecules/cm$^3$, preferably less than or equal to $5\times10^{21}$ molecules/cm$^3$, and more preferably less than or equal to $1\times10^{21}$ molecules/cm$^3$, which are measured by thermal desorption spectroscopy. When the first silicon nitride film and the second silicon nitride film are used as part of the insulating layer 302, the gate insulating layer 302 can be a gate insulating film which has few defects and from which little hydrogen and ammonia are released. Thus, the amount of hydrogen and nitrogen contained in the insulating layer 302 which enter the semiconductor layer 303 can be reduced.

In the case where the trap levels (also referred to as interface states) are present at the interface between an oxide semiconductor film and a gate insulating film or in the gate insulating film in a transistor including an oxide semiconductor, these trap levels cause a shift of the threshold voltage of the transistor, typically, a shift of the threshold voltage in the negative direction, and an increase in the subthreshold swing (S value) showing a gate voltage needed for changing the drain current by an order of magnitude when the transistor is turned on. This causes a problem in that electrical characteristics vary among transistors. Therefore, the use of a silicon nitride film having few defects as a gate insulating film and provision of an oxide insulating film in contact with the semiconductor layer 303 can reduce a shift of the threshold voltage in the negative direction and minimize an increase in S value.

The thickness of the insulating layer 302 is greater than or equal to 5 nm and less than or equal to 400 nm, preferably greater than or equal to 10 nm and less than or equal to 300 nm, and more preferably greater than or equal to 50 nm and less than or equal to 250 nm.

The semiconductor layer 303 can be an amorphous layer, a single-crystalline layer, or a polycrystalline layer. The thickness of the semiconductor layer 303 is greater than or equal to 1 nm and less than or equal to 100 nm, preferably greater than or equal to 1 nm and less than or equal to 50 nm, more preferably greater than or equal to 1 nm and less than or equal to 30 nm, and still more preferably greater than or equal to 3 nm and less than or equal to 20 nm.

An oxide semiconductor which can be used for the semiconductor layer 303 has an energy gap of greater than or equal to 2 eV, preferably greater than or equal to 2.5 eV, and more preferably greater than or equal to 3 eV. The use of such an oxide semiconductor having a wide energy gap can reduce the off-state current of the transistor 311.

An oxide semiconductor used for the semiconductor layer 303 preferably contains at least indium (In) or zinc (Zn). Alternatively, the oxide semiconductor preferably contains both In and Zn. In order to reduce variations in the electrical characteristics of transistors including the oxide semiconductor, the oxide semiconductor preferably contains one or more stabilizers in addition to one of or both In and Zn.

Examples of stabilizers are gallium (Ga), tin (Sn), hafnium (Hf), aluminum (Al), and zirconium (Zr). Other examples of stabilizers are lanthanoids such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

For an oxide semiconductor which can be used for the semiconductor layer 303, for example, the following can be used: an indium oxide; a tin oxide; a zinc oxide; an oxide containing two kinds of metals, such as an In—Zn-based oxide, a Sn—Zn-based oxide, an Al—Zn-based oxide, a Zn—Mg-based oxide, a Sn—Mg-based oxide, an In—Mg-based oxide, or an In—Ga-based oxide; an oxide containing three kinds of metals, such as an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—Zr—Zn-based oxide, an In—Ti—Zn-based oxide, an In—Sc—Zn-based oxide, an In—Y—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide; or an oxide containing four kinds of metals, such as an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide.

Here, an "In—Ga—Zn-based oxide" means an oxide containing In, Ga, and Zn as its main components and there is no particular limitation on the ratio of In, Ga, and Zn. Further, the In—Ga—Zn-based oxide may contain a metal element other than In, Ga, and Zn.

Alternatively, a material represented by $InMO_3(ZnO)_m$, (m>0) may be used as an oxide semiconductor. Note that M represents one or more metal elements selected from Ga, Fe, Mn, and Co, or the above element as a stabilizer.

For example, an In—Ga—Zn-based metal oxide with an atomic ratio of In:Ga:Zn=1:1:1 (=1/3:1/3:1/3), In:Ga:Zn=2:2:1 (=2/5:2/5:1/5), or In:Ga:Zn=3:1:2 (=1/2:1/6:1/3). Alternatively, an In—Sn—Zn-based oxide with an atomic ratio of In:Sn:Zn=1:1:1 (=1/3:1/3:1/3), In:Sn:Zn=2:1:3 (=1/3:1/6:1/2), or In:Sn:Zn=2:1:5 (=1/4:1/8:5/8) may be used. Note that the proportion of each atom in the atomic ratio of the metal oxide varies within a range of ±20% as an error.

Note that without limitation to the materials given above, a material with an appropriate atomic ratio depending on semiconductor characteristics and electrical characteristics (field-effect mobility, threshold voltage, and the like) may be used. Further, it is preferable to appropriately set the carrier density, the impurity concentration, the defect density, the atomic ratio of a metal element and oxygen, the interatomic distance, the density, or the like in order to obtain necessary semiconductor characteristics. For example, high field-effect mobility can be obtained relatively easily in the case of using an In—Sn—Zn oxide. Also in the case of using an In—Ga—Zn-based oxide, field-effect mobility can be increased by reducing the defect density in a bulk.

The insulating layer 305 can be formed using any of the materials that can be used for the insulating layer 302.

In particular, when the insulating layer 305 has a three-layer structure, it is preferable that a second oxide insulating film be formed over a first oxide insulating film and then a nitride insulating film be formed thereover. By providing the nitride insulating film, impurities such as hydrogen and water can be prevented from entering the transistor 311 (in particular, the semiconductor layer 303) from the outside. Note that the first oxide insulating film is not necessarily provided.

Further, an oxide insulating film in which the oxygen content is higher than that in the stoichiometric composition is preferably used as one of or both the first oxide insulating film and the second oxide insulating film. In that case, oxygen can be prevented from being released from the semiconductor layer 303, and the oxygen contained in an oxygen-excess region can be transferred to the semiconductor layer 303 to fill oxygen vacancies. For example, when an oxide insulating film having the feature described below is used, the oxygen vacancies in the semiconductor layer 303 can be filled. The feature of the oxide insulating film is that the number of oxygen molecules released from the oxide insulating film is greater than or equal to $1.0 \times 10^{18}$ molecules/cm$^3$ when measured by thermal desorption spectroscopy (hereinafter referred to as TDS). Note that an oxide insulating film partly including a region in which the oxygen content is higher than that in the stoichiometric composition (oxygen excess region) may be used as one of or both the first oxide insulating film and the second oxide insulating film. When such an oxygen excess region is present in a region overlapping with at least the semiconductor layer 303, oxygen is prevented from being released from the semiconductor layer 303 and the oxygen contained in the oxygen excess region can be transferred to the semiconductor layer 303 to fill oxygen vacancies.

In the case where the second oxide insulating film is an oxide insulating film in which the oxygen content is higher than that in the stoichiometric composition, the first oxide insulating film is preferably an oxide insulating film through which oxygen penetrates. Oxygen which enters the first oxide insulating film from the outside does not completely penetrate through the first oxide insulating film to be released and part thereof remains in the first oxide insulating film. Further, there is oxygen which is contained in the first oxide insulating film from the first and is released from the first oxide insulating film to the outside. Thus, the first oxide insulating film preferably has a high coefficient of diffusion of oxygen.

Since the first oxide insulating film is in contact with the semiconductor layer 303, the oxide insulating film is preferably an oxide insulating film through which oxygen penetrates and which has a low interface state density with the oxide semiconductor layer 303. For example, the first oxide insulating film preferably has a lower defect density than the second oxide insulating film. Specifically, the spin density of the first oxide insulating film at a g-value of 2.001 (E'-center) obtained by electron spin resonance is $3.0\times10^{17}$ spins/cm$^3$ or lower, preferably $5.0\times10^{16}$ spins/cm$^3$ or lower. Note that the spin density at a g-value of 2.001 obtained by electron spin resonance corresponds to the number of dangling bonds contained in the first oxide insulating film.

The thickness of the first oxide insulating film can be greater than or equal to 5 nm and less than or equal to 150 nm, preferably greater than or equal to 5 nm and less than or equal to 50 nm, and more preferably greater than or equal to 10 nm and less than or equal to 30 nm. The thickness of the second oxide insulating film can be greater than or equal to 30 nm and less than or equal to 500 nm, preferably greater than or equal to 150 nm and less than or equal to 400 nm.

When the first oxide insulating film over the semiconductor layer 303 penetrates oxygen and has a low interface state density with the semiconductor layer 303 and the second oxide insulating film includes an oxygen-excess region or oxygen whose content is higher than that in the stoichiometric composition, oxygen can be easily supplied to the semiconductor layer 303, the release of oxygen from the semiconductor layer 303 can be prevented, and the oxygen contained in the second oxide insulating film can be transferred to the semiconductor layer 303 to fill oxygen vacancies in the semiconductor layer 303. Thus, the transistor 311 can be prevented from being normally on.

In the case where an oxide insulating film containing nitrogen, such as a silicon oxynitride film or a silicon nitride oxide film, is used as one of or both the first oxide insulating film and the second oxide insulating film, the nitrogen concentration measured by secondary ion mass spectrometry (SIMS) is higher than or equal to the lower limit of measurement by SIMS and lower than $3\times10^{20}$ atoms/cm$^3$, preferably higher than or equal to $1\times10^{18}$ atoms/cm$^3$ and lower than or equal to $1\times10^{20}$ atoms/cm$^3$. In that case, the amount of nitrogen which enters the semiconductor layer 303 included in the transistor 311 can be reduced and the number of defects in the nitrogen-containing oxide insulating film itself can be reduced.

In the case where a nitride insulating film is used in the insulating layer 305, one of or both the first oxide insulating film and the second oxide insulating film preferably has a barrier property against nitrogen. For example, a dense oxide insulating film can have a barrier property against nitrogen. Specifically, it is preferably to use an oxide insulating film which can be etched at a rate less than or equal to 10 nm per minute when the temperature is 25° C. and 0.5 wt % of fluoric acid is used.

As the nitride insulating film, a nitride insulating film with a low hydrogen content can be provided. The nitride insulating film is as follows, for example: the number of hydrogen molecules released from the nitride insulating film is less than $5.0\times10^{21}$ molecules/cm$^3$, preferably less than $3.0\times10^{21}$ molecules/cm$^3$, and more preferably less than $1.0\times10^{21}$ molecules/cm$^3$ when measured by TDS spectroscopy.

Further, the nitride insulating film has excellent step coverage and thus can be advantageously used as a protective insulating film of the transistor 311.

The nitride insulating film has a thickness large enough to prevent entry of impurities such as hydrogen and water from the outside. For example, the thickness of the nitride insulating film can be greater than or equal to 50 nm and less than or equal to 200 nm, preferably greater than or equal to 50 nm and less than or equal to 150 nm, and more preferably greater than or equal to 50 nm and less than or equal to 100 nm.

By providing the nitride insulating film over the second oxide insulating film, impurities such as hydrogen and water can be prevented from entering the semiconductor layer 303 from the outside. Moreover, when a nitride insulating film with a low hydrogen content is provided as the nitride insulating film, it is possible to reduce variations in the electrical characteristics of the transistor 311.

The conductive layer 307 is formed using a light-transmitting conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added.

<6. Modified Examples of the Top Structure of the Pixel>

The layout of the pixel in the liquid crystal display device of the present invention is not limited to the structure in FIGS. 8A to 8C. For example, the conductive layers 304A and 304B overlapping with the semiconductor layer may have a U-shape or a C-shape.

Figure 9A:
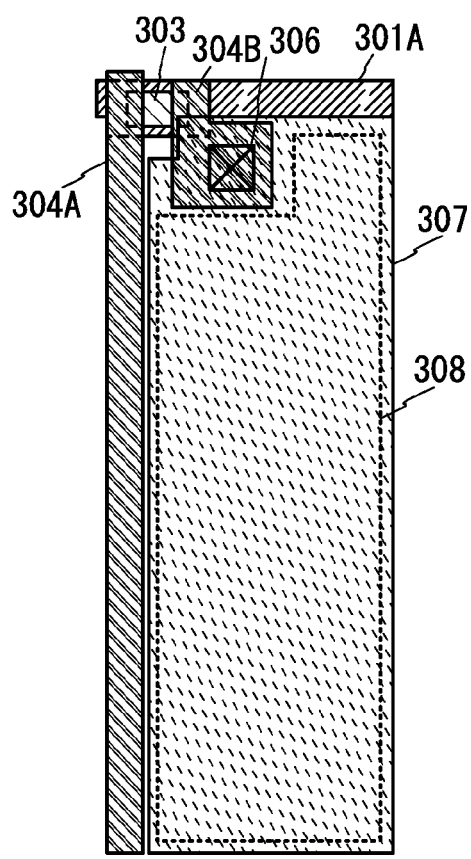
FIGS. 9A and 9B are top views of a pixel of a liquid crystal display device.

Further, although the conductive layers 301B and 304B overlap with each other to form the capacitor 312 in FIGS. 8A to 8C, the conductive layer 301B may be omitted as illustrated in FIG. 9A so that the capacitor is intentionally omitted. In that case, the parasitic capacitance generated in the conductive layer 307 is actively used, whereby the aperture ratio can be further increased.

Figure 9B:
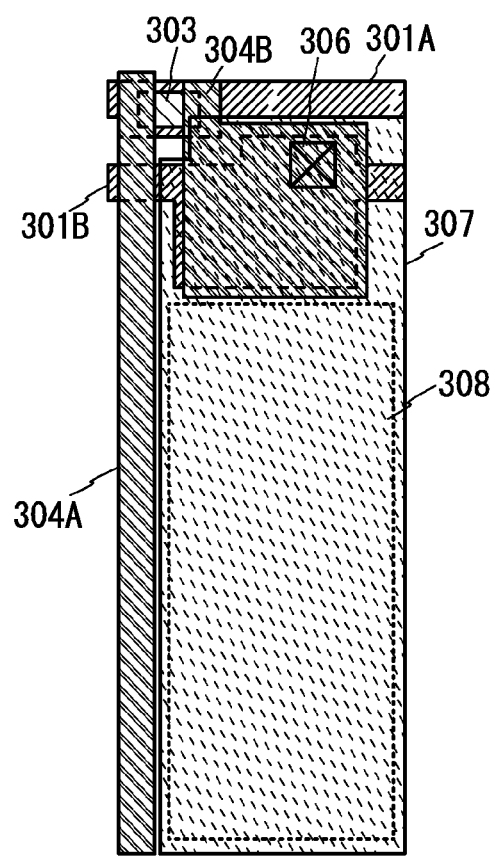

In FIGS. 8A to 8C, the conductive layers 301B and 304B overlap with each other to form the capacitor 312, and this area in which the conductive layers 301B and 304B overlap with each other is increased in some cases as illustrated in FIG. 9B, so that the capacitance of the capacitor is intentionally increased. In that case, the effect of parasitic capacitance can be alleviated.

The top view of the pixel illustrated in FIG. 8A is designed so that the pixel density is higher than or equal to 300 ppi and the capacitance in the pixel is 15 fF ($1.5\times10^{-14}$ F). The pixel in FIG. 8A has an aperture ratio of 61.0%. The top view of the pixel illustrated in FIG. 9A is designed so that the pixel density is higher than or equal to 300 ppi and a capacitor line in the pixel is omitted. The pixel in FIG. 9A has an aperture ratio of 67.0%. The top view of the pixel illustrated in FIG. 9B is designed so that the pixel density is higher than or equal to 300 ppi and the capacitance in the pixel is 30 fF ($3.0\times10^{-14}$ F). The pixel in FIG. 9B has an aperture ratio of 55.2%.

<7. Liquid Crystal Display Device Disclosed in this Specification>

In the liquid crystal display device disclosed in this specification, the overdrive voltage amplified by overdriving can be switched depending on the degree of change in a video voltage in continuous frame periods. Consequently, even when the voltage level Vpix in the (k+1)th frame period varies because of the voltage level SL whose polarity is opposite to that in the k-th frame period, the degree of variation can be reduced. As a result, it is possible to prevent the following defect: the optical response of a liquid crystal element differs between pixels in the first-half rows and pixels in the second-half rows even when the same video voltage is written to the pixel portion, and a variation in contrast is caused even when an image with the same gray level is displayed with the same video voltage.

In the aforementioned liquid crystal display device disclosed in this specification, frame inversion driving is preferably performed and source line inversion driving is more preferably performed. Since the polarity of video voltages applied to pixel electrodes of pixels arranged in the column direction is similarly inverted, the above-described variation in contrast can be prevented more effectively.

The aforementioned prevention of a variation in contrast is particularly effective in a liquid crystal display device in which a capacitor in a pixel has a low capacitance, for example, the pixel density is higher than or equal to 300 ppi, the aperture ratio is higher than or equal to 60%, and the capacitance in the pixel is lower than or equal to 30 fF ($3.0 \times 10^{-14}$ F). In other words, according to one embodiment of the present invention, both a high aperture ratio and a high definition can be achieved while lowering of display quality is prevented.

According to one embodiment of the present invention, even when the capacitance of a pixel is reduced as much as possible in order to achieve a high aperture ratio, lowering of display quality due to parasitic capacitance generated in a pixel electrode can be prevented.

This embodiment can be implemented in appropriate combination with the structures described in the other embodiments.

(Embodiment 2)

In this embodiment, the appearance and a cross section of a liquid crystal display device will be illustrated and the structure thereof will be described.

Note that the liquid crystal display device includes the following modules in its category: a module provided with a connector, for example, a flexible printed circuit (FPC), a tape automated bonding (TAB) tape, or a tape carrier package (TCP); a module provided with a printed wiring board at the end of a TAB tape or a TCP; and a module where an integrated circuit (IC) is directly mounted on a display element by a chip-on-glass (COG) method.

Figure 10B:
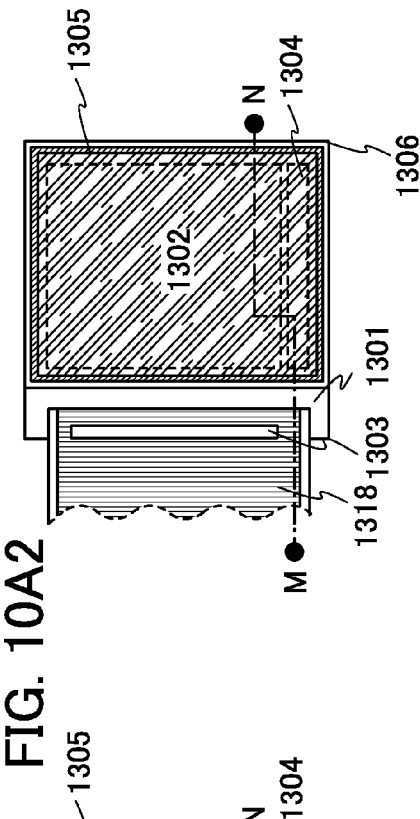
Figure 10B:
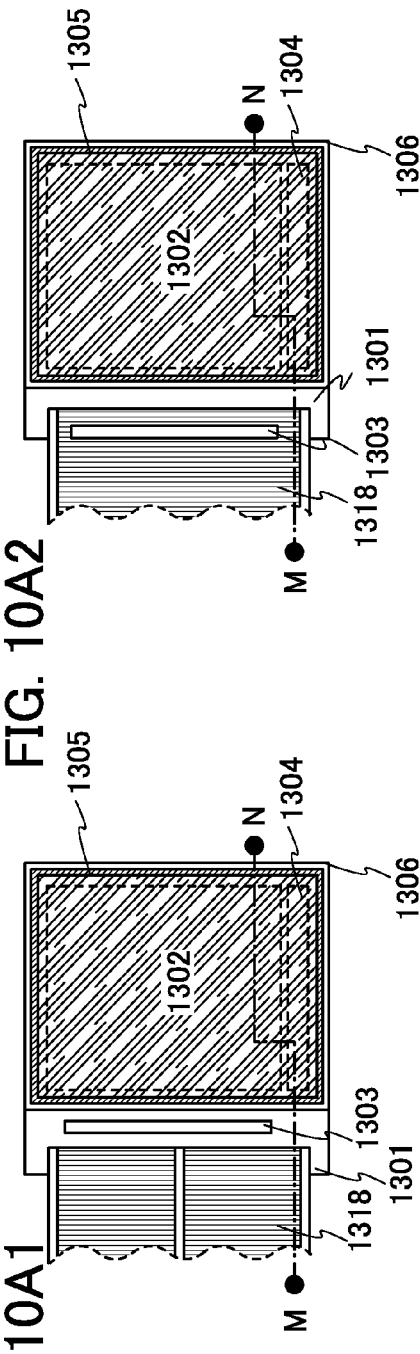
Figure 10B:
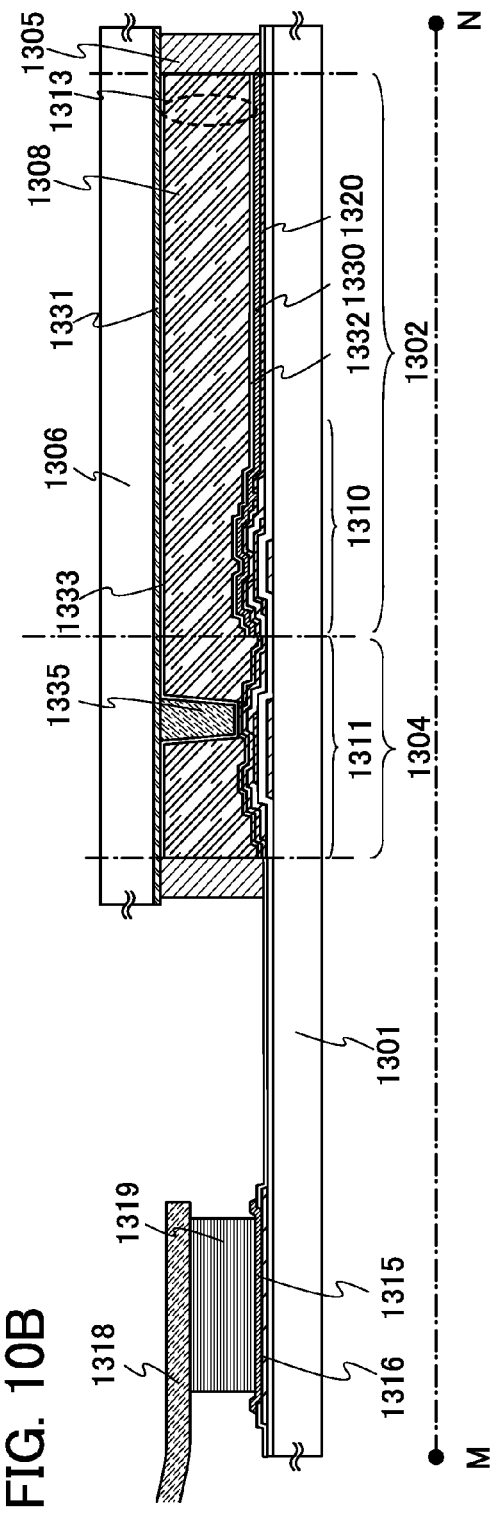

The appearance and a cross section of a liquid crystal display device will be described with reference to FIGS. 10A1, 10A2, and 10B. FIGS. 10A1 and 10A2 are each a plan view of a panel in which transistors 1310 and 1311 and a liquid crystal element 1313 are sealed between a first substrate 1301 and a second substrate 1306 with a sealant 1305. FIG. 10B is a cross-sectional view along line M-N in FIGS. 10A1 and 10A2.

The sealant 1305 is provided to surround a pixel portion 1302 and a gate line driver circuit 1304 that are provided over the first substrate 1301. The second substrate 1306 is provided over the pixel portion 1302 and the gate line driver circuit 1304. Thus, the pixel portion 1302 and the gate line driver circuit 1304 are sealed together with a liquid crystal layer 1308, by the first substrate 1301, the sealant 1305, and the second substrate 1306. A source line driver circuit 1303 that is formed using a single crystal semiconductor film or a polycrystalline semiconductor film over a substrate separately prepared is mounted in a region that is different from the region surrounded by the sealant 1305 over the first substrate 1301.

Note that there is no particular limitation on the connection method of a driver circuit which is separately formed, and a COG method, a wire bonding method, a TAB method, or the like can be used. FIG. 10A1 illustrates an example of mounting the source line driver circuit 1303 by a COG method, and FIG. 10A2 illustrates an example of mounting the source line driver circuit 1303 by a TAB method.

The pixel portion 1302 and the gate line driver circuit 1304 provided over the first substrate 1301 include a plurality of transistors. FIG. 10B illustrates the transistor 1311 included in the pixel portion 1302 and the transistor 1311 included in the gate line driver circuit 1304, as an example. An insulating layer 1320 is provided over the transistors 1310 and 1311.

In each of the transistors 1310 and 1311, an oxide semiconductor can be used for a semiconductor layer. In this embodiment, the transistors 1310 and 1311 are n-channel transistors.

A pixel electrode layer 1330 included in the liquid crystal element 1313 is connected to the transistor 1310. A counter electrode layer 1331 of the liquid crystal element 1313 is formed on the second substrate 1306. A portion where the pixel electrode layer 1330, the counter electrode layer 1331, and the liquid crystal layer 1308 overlap with one another corresponds to the liquid crystal element 1313. Note that the pixel electrode layer 1330 and the counter electrode layer 1331 are provided with an insulating layer 1332 and an insulating layer 1333 serving as alignment films, respectively, and the liquid crystal layer 1308 is sandwiched between the pixel electrode layer 1330 and the counter electrode layer 1331 with the insulating layers 1332 and 1333 placed therebetween.

A light-transmitting substrate can be used as the first substrate 1301 and the second substrate 1306; glass, ceramics, or plastics can be used. As plastics, a fiberglass-reinforced plastic (FRP) plate, a polyvinyl fluoride (PVF) film, a polyester film, or an acrylic resin film can be used.

A structure 1335 is a columnar spacer obtained by selective etching of an insulating film and is provided in order to control the distance (a cell gap) between the pixel electrode layer 1330 and the counter electrode layer 1331. Alternatively, a spherical spacer may be used. The counter electrode layer 1331 is connected to a common potential line formed over the substrate where the transistor 1310 is formed. With the use of a common contact portion, the counter electrode layer 1331 and the common potential line can be connected to each other by conductive particles arranged between the pair of substrates. Note that the conductive particles can be included in the sealant 1305.

Note that as a display mode of the liquid crystal element, any of the following can be used: a twisted nematic (TN) mode, an in-plane-switching (IPS) mode, a fringe field switching (FFS) mode, a multi-domain vertical alignment (MVA) mode, a patterned vertical alignment (PVA) mode, an axially symmetric aligned micro-cell (ASM) mode, an optically compensated birefringence (OCB) mode, a ferroelectric liquid crystal (FLC) mode, an anti-ferroelectric liquid crystal (AFLC) mode, and the like. Note that the electrode structure or the like in the liquid crystal display device can be changed as appropriate in accordance with the display mode.

Alternatively, liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase is generated within an only narrow range of temperature, liquid crystal composition containing a chiral material at 5 wt % or more so as to improve the temperature range is used for the liquid crystal layer 1308. The liquid crystal composition which includes a liquid crystal showing a blue phase and a chiral material has a short response time of 1 msec or less and has optical isotropy, which makes the alignment process unnecessary and the viewing angle dependence small.

Note that in this embodiment, a transflective liquid crystal display device can be used in addition to a transmissive liquid crystal display device.

This embodiment shows the example of the liquid crystal display device in which a polarizing plate is provided on the outer side of the substrate (on the viewer side) and a coloring layer and an electrode layer used for a display element are provided in this order on the inner side of the substrate; alternatively, a polarizing plate may be provided on the inner side of the substrate. The stacked structure of the polarizing plate and the coloring layer is not limited to that in this embodiment and may be set as appropriate depending on materials of the polarizing plate and the coloring layer or conditions of manufacturing process. Further, a light-shielding film serving as a black matrix may be provided in a portion other than the display portion.

The transistors 1310 and 1311 each includes a gate insulating layer, a gate electrode layer, and a wiring layer (e.g., a source wiring layer or a capacitor wiring layer), in addition to the semiconductor layer.

The insulating layer 1320 is formed over the transistors 1310 and 1311. As the insulating layer 1320, a silicon nitride film is formed by a sputtering method, for example.

The pixel electrode layer 1330 and the counter electrode layer 1331 can be formed using a light-transmitting conductive material such as indium oxide containing tungsten oxide, indium zinc oxide containing tungsten oxide, indium oxide containing titanium oxide, indium tin oxide containing titanium oxide, indium tin oxide, indium zinc oxide, or indium tin oxide to which silicon oxide is added.

As the conductive high molecule, a so-called it-electron conjugated conductive polymer can be used. For example, polyaniline or a derivative thereof, polypyrrole or a derivative thereof, polythiophene or a derivative thereof, and a copolymer of two or more of aniline, pyrrole, and thiophene or a derivative thereof can be used.

A variety of signals and potentials are supplied to the source line driver circuit 1303 which is formed separately, and the gate line driver circuit 1304 or the pixel portion 1302 from an FPC 1318.

A connection terminal electrode 1315 is formed using the same conductive film as the pixel electrode layer 1330 included in the liquid crystal element 1313. A terminal electrode 1316 is formed using the same conductive film as source and drain electrode layers of the transistors 1310 and 1311.

The connection terminal electrode 1315 is electrically connected to a terminal included in the FPC 1318 via an anisotropic conductive film 1319.

Although FIGS. 10A1, 10A2, and 10B show the example in which the source line driver circuit 1303 is formed separately and mounted on the first substrate 1301, this embodiment is not limited to this structure. The gate line driver circuit may be formed separately and then mounted, or only part of the source line driver circuit or part of the gate line driver circuit may be formed separately and then mounted.

This embodiment can be implemented in appropriate combination with the structures described in the other embodiments.

(Embodiment 3)

In this embodiment, specific examples of electronic devices each of which is manufactured using the liquid crystal display device described in any of the above embodiments are described with reference to FIGS. 11A to 11C.

Examples of electronic devices to which one embodiment of the present invention can be applied include a television set (also referred to as a television or a television receiver), a monitor of a computer or the like, a camera such as a digital camera or a digital video camera, a digital photo frame, a mobile phone, a portable game machine, a portable information terminal, an audio reproducing device, a game machine (e.g., a pachinko machine or a slot machine), and a game console. FIGS. 11A to 11C illustrate specific examples of these electronic devices.

Figure 11A:
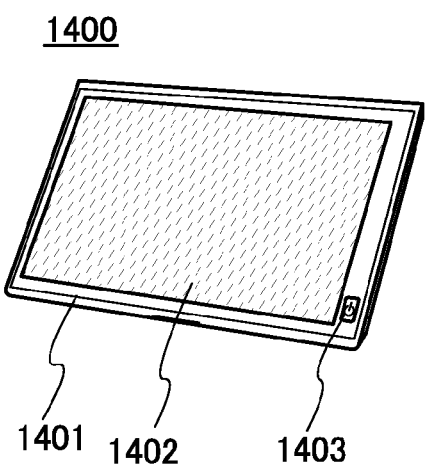
FIGS. 11A to 11C are views showing electronic devices using a liquid crystal display device.

FIG. 11A illustrates a portable information terminal 1400 including a display portion. The portable information terminal 1400 includes a display portion 1402 and an operation button 1403 which are incorporated in a housing 1401. The liquid crystal display device of one embodiment of the present invention can be used for the display portion 1402.

Figure 11B:
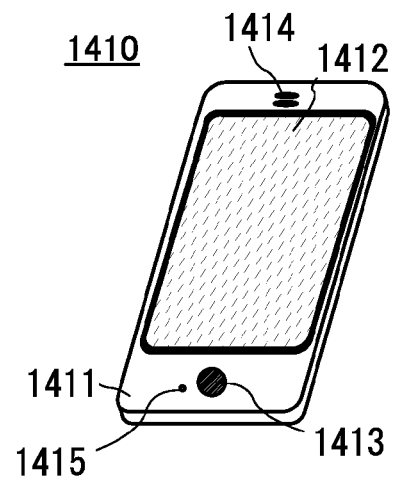

FIG. 11B illustrates a cellular phone 1410. The cellular phone 1410 includes a display portion 1412, an operation button 1413, a speaker 1414, and a microphone 1415 which are incorporated in a housing 1411. The liquid crystal display device of one embodiment of the present invention can be used for the display portion 1412.

Figure 11C:
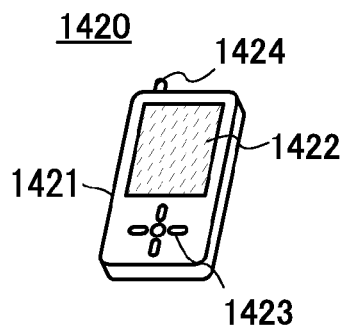

FIG. 11C illustrates an audio reproducing device 1420. The audio reproducing device 1420 includes a display portion 1422, an operation button 1423, and an antenna 1424 which are incorporated in a housing 1421. In addition, the antenna 1424 transmits and receives data via a wireless signal. The liquid crystal display device of one embodiment of the present invention can be used for the display portion 1422.

The display portions 1402, 1412, and 1422 each have a touch-input function. When a user touches a displayed button (not illustrated) which is displayed on the display portion 1402, 1412, or 1422 with his/her fingers or the like, the user can carry out operation on the screen and input of information.

When the liquid crystal display device shown in any of the above embodiments is used for the display portions 1402, 1412, and 1422, both the aperture ratio and the definition can be made higher than ever before while lowering of display quality is prevented.

This embodiment can be implemented in appropriate combination with the structures described in the other embodiments.

This application is based on Japanese Patent Application serial No. 2012-226747 filed with Japan Patent Office on Oct. 12, 2012, the entire contents of which are hereby incorporated by reference.

What is claimed is:

1. A liquid crystal display device comprising:
 a pixel portion including pixels arranged in m rows and n columns, where m and n are each a natural number greater than or equal to 2; and
 an overdrive voltage generation portion in which an overdrive voltage higher than a video voltage is generated, and the overdrive voltage and the video voltage are applied to a pixel electrode of a pixel during a gate selection period,
 wherein the overdrive voltage generation portion comprises:
  a video voltage comparator circuit in which an average of first video voltages applied to pixel electrodes of pixels in an (x+1)th row to an m-th row in a k-th frame period is, for each row, compared with an average of second video voltages applied to pixel electrodes of pixels in a first row to an x-th row in a (k+1)th frame period, where x is a natural number greater than 1 and less than m, and where k is a natural number; and
  an overdrive voltage switching circuit in which when a difference obtained from a comparison in the video voltage comparator circuit is greater than or equal to a threshold value, the overdrive voltage in the (k+1)th frame period is switched to a first overdrive voltage, and when the difference obtained from the comparison in the video voltage comparator circuit is less than the threshold value, the overdrive voltage in the (k+1)th frame period is switched to a second overdrive voltage lower than the first overdrive voltage, wherein a pixel density in the pixel portion is higher than or equal to 300 ppi, wherein an aperture ratio in the pixel is higher than or equal to 60%, and wherein a capacitor in the pixel comprises a static capacitance of 30 fF or lower, wherein the video voltage comparator circuit comprises:
a first selection circuit configured to sort data signals input to the first selection circuit for each frame period,
a first storage circuit configured to store a first data signal in one frame period,
a second storage circuit configured to store a second data signal in one frame period,
an arithmetic circuit configured to add the first and second data signals in the respective frame periods, which are stored in the first storage circuit and the second storage circuit and calculate an average,
a comparator circuit configured to calculate a difference between the average of the video voltages in the k-th frame period and the average of the video voltages in the (k+1)th frame period, and compare the difference with a reference voltage which is to be the threshold value, and output a comparison data signal, and
a second selection circuit configured to select a data signal in a frame period during which the overdrive voltage is determined between a data signal data_k in the k-th frame period and a data signal data_k+1 in the (k+1)th frame period, and output the data signal in order to the overdrive voltage switching circuit, wherein the overdrive voltage switching circuit comprises:
a lookup table address generation circuit for generating a lookup table address indicating a lookup table which stores the overdrive voltage obtained based on inputted the data signal,
a third selection circuit configured to sort the lookup table address in accordance with the compared data signal,
a first lookup table configured to sort a first compensation coefficient corresponding to each bit when the difference is higher than the threshold value, which is necessary for calculating the first overdrive voltage with use of the video voltage,
a second lookup table configured to sort a second compensation coefficient corresponding to each bit when the difference is lower than the threshold value, which is necessary for calculating the second overdrive voltage with use of the video voltage, and
an overdrive voltage arithmetic circuit configured to perform interpolation of the video voltage in accordance with the first compensation coefficient or the second compensation coefficient in order to convert the video voltage into the overdrive voltage.

2. The liquid crystal display device according to claim 1, wherein the liquid crystal display device is a transflective liquid crystal display device.

3. The liquid crystal display device according to claim 1, wherein the liquid crystal display device is a transmissive liquid crystal display device.

4. The liquid crystal display device according to claim 1, wherein the threshold value is a voltage level of half a video voltage with the maximum grayscale level of a video image signal.

5. An electronic device comprising the liquid crystal display device according to claim 1, wherein the electronic device is selected from the group consisting of a portable information terminal, a cellular phone, and an audio reproducing device.

6. A liquid crystal display device comprising:
a pixel portion including pixels arranged in m rows and n columns, where m and n are each a natural number greater than or equal to 2; and
an overdrive voltage generation portion in which an overdrive voltage higher than a video voltage is generated, and the overdrive voltage and the video voltage are applied to a pixel electrode of a pixel during a gate selection period, wherein the overdrive voltage generation portion comprises:
a video voltage comparator circuit in which an average of first video voltages applied to pixel electrodes of pixels in an (x+1)th row to an m-th row in a k-th frame period is, for each row, compared with an average of second video voltages applied to pixel electrodes of pixels in a first row to an x-th row in a (k+1)th frame period, where x is a natural number greater than 1 and less than m, and where k is a natural number; and
an overdrive voltage switching circuit in which when a difference obtained from a comparison in the video voltage comparator circuit is greater than or equal to a threshold value, the overdrive voltage in the (k+1)th frame period is switched to a first overdrive voltage, and when the difference obtained from the comparison in the video voltage comparator circuit is less than the threshold value, the overdrive voltage in the (k+1)th frame period is switched to a second overdrive voltage lower than the first overdrive voltage, wherein the video voltage comparator circuit comprises:
a first selection circuit configured to sort data signals input to the first selection circuit for each frame period,
first storage circuit configured to store a first data signal in one frame period,
a second storage circuit configured to store a second data signal in one frame period,
an arithmetic circuit configured to add the first and second data signals in the respective frame periods, which are stored in the first storage circuit and the second storage circuit and calculate an average,
a comparator circuit configured to calculate a difference between the average of the video voltages in the k-th frame period and the average of the video voltages in the (k+1)th frame period, and compare the difference with a reference voltage which is to be the threshold value, and output a comparison data signal, and
a second selection circuit configured to select a data signal in a frame period during which the overdrive voltage is determined between a data signal data_k in the k-th frame period and a data signal data_k+1 in the (k+1)th frame period, and output the data signal in order to the overdrive voltage switching circuit, wherein the overdrive voltage switching circuit comprises:
a lookup table address generation circuit for generating a lookup table address indicating a lookup table which stores the overdrive voltage obtained based on inputted the data signal,
a third selection circuit configured to sort the lookup table address in accordance with the compared data signal,
a first lookup table configured to sort a first compensation coefficient corresponding to each bit when the difference is higher than the threshold value, which is necessary for calculating the first overdrive voltage with use of the video voltage,
a second lookup table configured to sort a second compensation coefficient corresponding to each bit when the difference is lower than the threshold value, which is necessary for calculating the second overdrive voltage with use of the video voltage, and
an overdrive voltage arithmetic circuit configured to perform interpolation of the video voltage in accordance with the first compensation coefficient or the second compensation coefficient in order to convert the video voltage into the overdrive voltage, and
wherein a semiconductor layer included in a transistor in the pixel portion comprises an oxide semiconductor layer.

7. The liquid crystal display device according to claim 6,
wherein a pixel density in the pixel portion is higher than or equal to 300 ppi,
wherein an aperture ratio in the pixel is higher than or equal to 60%, and
wherein a capacitor in the pixel portion comprises a static capacitance of 30 fF or lower.

8. The liquid crystal display device according to claim 6, wherein the semiconductor layer comprises a substantially intrinsic semiconductor.

9. The liquid crystal display device according to claim 6, wherein a carrier density of the semiconductor layer is equal to or lower than $1 \times 10^{17}/cm^3$.

10. The liquid crystal display device according to claim 6, wherein the liquid crystal display device is a transflective liquid crystal display device.

11. The liquid crystal display device according to claim 6, wherein the liquid crystal display device is a transmissive liquid crystal display device.

12. The liquid crystal display device according to claim 6, wherein the threshold value is a voltage level of half a video voltage with the maximum grayscale level of a video image signal.

13. An electronic device comprising the liquid crystal display device according to claim 6, wherein the electronic device is selected from the group consisting of a portable information terminal, a cellular phone, and an audio reproducing device.

14. A method for driving a liquid crystal display device comprising pixels arranged in m rows and n columns, where m and n are each a natural number greater than or equal to 2, and performing overdriving in which an overdrive voltage higher than a video voltage is applied to a pixel electrode of a pixel during a gate selection period, and then the video voltage is applied to the pixel electrode,
the method for driving the liquid crystal display device comprising the steps of:
comparing an average of first video voltages applied to pixel electrodes of pixels in an (x+1)th row to an m-th row in a k-th frame period with an average of second video voltages applied to pixel electrodes of pixels in a first row to an x-th row in a (k+1)th frame period for each row, where x is a natural number greater than 1 and less than m, and where k is a natural number in a video voltage comparator circuit comprising a first selection circuit, a first storage, a second storage, an arithmetic circuit, a comparator circuit, and a second selection circuit; and
performing overdriving in the (k+1)th frame period, with use of a first overdrive voltage when a difference obtained from a comparison is greater than or equal to a threshold value, and with use of a second overdrive voltage when the difference obtained from the comparison is less than the threshold value in an overdrive voltage switching circuit comprising a lookup table address generation circuit, a third selection circuit, a first lookup table, a second lookup table, and an overdrive voltage arithmetic circuit,
wherein data signals data input to the first selection circuit are sorted in the first selection circuit for each frame period,
wherein a first data signal is stored in the first storage circuit in one frame period,
wherein a second data signal is stored in the second storage circuit in one frame period,
wherein the first and second data signals in the respective frame periods are added, which are stored in the first storage circuit and the second storage circuit, and an average is calculated in the arithmetic circuit,
wherein a difference between the average of the video voltages in the k-th frame period and the average of the video voltages in the (k+1)th frame period is calculated, and the difference with a reference voltage which is to be the threshold value is compared in the comparator circuit, and output a comparison data signal,
wherein a data signal in a frame period during which the overdrive voltage is determined between the data signal data_k in the k-th frame period and the data signal data_k+1 in the (k+1)th frame period is selected, and the data signal to the overdrive voltage switching circuit is output in the second selection circuit,
wherein a lookup table address indicating the lookup tables which store the overdrive voltage obtained based on the data signal is generated in the lookup table address generation circuit,
wherein the lookup table address in accordance with the comparison data signal is sorted in the third selection circuit,
wherein a first compensation coefficient corresponding to each bit, which is necessary for calculating a first overdrive voltage with use of an video voltage is stored in the first lookup table,
wherein a second compensation coefficient corresponding to each bit, which is necessary for calculating a second overdrive voltage with use of the original video voltage is stored in the second lookup table, and
wherein interpolation of the video voltage in accordance with the first compensation coefficient or the second compensation coefficient is performed in the overdrive voltage arithmetic circuit in order to convert the video voltage into the overdrive voltage.

15. The method for driving a liquid crystal display device, according to claim 14, wherein frame inversion driving is performed in the k-th frame period and the (k+1)th frame period.

16. The method for driving a liquid crystal display device, according to claim 14, wherein source line inversion driving is performed in the k-th frame period and the (k+1)th frame period.

17. The method for driving a liquid crystal display device, according to claim 14, wherein a semiconductor layer included in a transistor in a pixel portion including the pixels comprises an oxide semiconductor layer.

18. The method for driving a liquid crystal display device, according to claim 14,
wherein the threshold value is a voltage level of half a video voltage with the maximum grayscale level of a video image signal.

19. The method for driving a liquid crystal display device, according to claim 14,
wherein a pixel density in the pixel portion is higher than or equal to 300 ppi,
wherein an aperture ratio in the pixel is higher than or equal to 60%, and
wherein a capacitor in the pixel comprises a static capacitance of 30 fF or lower.

\* \* \* \* \*

UNITED STATES PATENT AND TRADEMARK OFFICE
CERTIFICATE OF CORRECTION

PATENT NO.      : 9,449,574 B2
APPLICATION NO. : 14/049300
DATED           : September 20, 2016
INVENTOR(S)     : Miyake et al.

Page 1 of 1

It is certified that error appears in the above-identified patent and that said Letters Patent is hereby corrected as shown below:

In the Specification

Column 18, Line 45, delete "1 fl" and insert -- 1 fF --

Column 27, Line 28, delete "it electron" and insert -- π-electron --

In the Claims

Column 30, Line 48, Claim 6 delete "first" and insert -- a first --

Signed and Sealed this
Sixth Day of June, 2017

Michelle K. Lee
*Director of the United States Patent and Trademark Office*